(12) United States Patent
Burch et al.

(10) Patent No.: US 9,256,258 B2
(45) Date of Patent: Feb. 9, 2016

(54) TABLET CASE

(71) Applicant: Milwaukee Electric Tool Corporation, Brookfield, WI (US)

(72) Inventors: Wade F. Burch, Wauwatosa, WI (US);
Jason R. Crowe, Milwaukee, WI (US);
Steven W. Hyma, Milwaukee, WI (US);
Timothy Janda, Stevensville, MI (US);
Michael S. Steele, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 437 days.

(21) Appl. No.: 13/781,363

(22) Filed: Feb. 28, 2013

(65) Prior Publication Data
US 2013/0235521 A1 Sep. 12, 2013

Related U.S. Application Data

(60) Provisional application No. 61/604,958, filed on Feb. 29, 2012, provisional application No. 61/650,326, filed on May 22, 2012.

(51) Int. Cl.
| G06F 1/16 | (2006.01) |
| H05K 5/00 | (2006.01) |
| H05K 7/00 | (2006.01) |
| G06F 1/20 | (2006.01) |

(52) U.S. Cl.
CPC ............ *G06F 1/1635* (2013.01); *G06F 1/1628* (2013.01); *G06F 1/20* (2013.01); *G06F 1/203* (2013.01); *G06F 2200/1633* (2013.01)

(58) Field of Classification Search
CPC ............................. G06F 1/1626; G06F 1/1632
USPC ............... 206/701, 703, 706, 775; 361/679.3, 361/679.26, 679.55, 679.56, 679.41, 361/679.42, 679.43, 679.48
See application file for complete search history.

(56) References Cited

U.S. PATENT DOCUMENTS

| 3,997,819 A | 12/1976 | Eggert et al. |
| 4,768,230 A | 8/1988 | Viebrantz et al. |
| 4,997,103 A | 3/1991 | Daly |
| 5,105,335 A | 4/1992 | Honda |
| 5,146,390 A | 9/1992 | Wong |
| 5,191,544 A | 3/1993 | Benck et al. |

(Continued)

FOREIGN PATENT DOCUMENTS

| DE | 3318581 | 11/1984 |
| DE | 4036994 | 5/1992 |

(Continued)

*Primary Examiner* — Anthony Haughton
(74) *Attorney, Agent, or Firm* — Michael Best & Friedrich LLP

(57) ABSTRACT

A computer case for protecting a computer. The computer case comprising a front housing and a rear housing. The front housing including a first aperture operable to allow a user to operate the computer. The rear housing pivotally coupled to the front housing, the rear housing including a latch for securing the computer between the front housing and the rear housing, a battery receptacle for receiving a battery, an electrical interface for electrical communication with the computer, an electrical input, and a controller. Wherein the controller is operable to receive power from the battery, provide power to the computer via the electrical interface, receive an electrical signal from the electrical input, and output the electrical signal to the computer via the electrical interface.

20 Claims, 30 Drawing Sheets

(56) References Cited

U.S. PATENT DOCUMENTS

| | | | |
|---|---|---|---|
| 5,239,446 A | 8/1993 | Matsumura et al. | |
| 5,327,322 A | 7/1994 | Ma | |
| 5,329,422 A | 7/1994 | Sasaki | |
| 5,331,506 A | 7/1994 | Nakajima | |
| 5,360,108 A | 11/1994 | Alagia | |
| 5,373,458 A | 12/1994 | Bishay et al. | |
| 5,400,213 A | 3/1995 | Honda et al. | |
| 5,568,358 A | 10/1996 | Nelson et al. | |
| 5,583,742 A * | 12/1996 | Noda et al. | 361/679.21 |
| 5,586,002 A | 12/1996 | Notarianni | |
| 5,796,576 A | 8/1998 | Kim | |
| 5,812,188 A | 9/1998 | Adair | |
| 5,905,632 A | 5/1999 | Seto et al. | |
| 5,940,153 A | 8/1999 | Castaneda et al. | |
| D419,297 S | 1/2000 | Richardson et al. | |
| 6,317,313 B1 * | 11/2001 | Mosgrove et al. | 361/679.3 |
| 6,354,461 B1 | 3/2002 | Tenney et al. | |
| 6,646,864 B2 | 11/2003 | Richardson | |
| 6,995,976 B2 | 2/2006 | Richardson | |
| 7,023,692 B2 | 4/2006 | Mansutti et al. | |
| 7,158,376 B2 | 1/2007 | Richardson et al. | |
| 7,180,735 B2 | 2/2007 | Thomas et al. | |
| 7,230,823 B2 | 6/2007 | Richardson et al. | |
| 7,312,984 B2 | 12/2007 | Richardson et al. | |
| 7,449,650 B2 | 11/2008 | Richardson et al. | |
| 7,609,512 B2 | 10/2009 | Richardson et al. | |
| 7,663,879 B2 | 2/2010 | Richardson et al. | |
| 7,688,580 B2 | 3/2010 | Richardson et al. | |
| 7,889,489 B2 | 2/2011 | Richardson et al. | |
| 7,907,394 B2 | 3/2011 | Richardson et al. | |
| 7,933,122 B2 | 4/2011 | Richardson et al. | |
| 8,191,706 B1 * | 6/2012 | Liu | 206/320 |
| 8,503,170 B1 * | 8/2013 | Hsu et al. | 361/679.02 |
| 9,025,317 B2 * | 5/2015 | Richardson et al. | 361/679.01 |
| 2001/0029588 A1 * | 10/2001 | Nakamura et al. | 713/300 |
| 2006/0104021 A1 * | 5/2006 | Chen et al. | 361/683 |
| 2006/0279924 A1 | 12/2006 | Richardson et al. | |
| 2007/0139873 A1 | 6/2007 | Thomas et al. | |
| 2007/0297149 A1 | 12/2007 | Richardson et al. | |
| 2009/0009945 A1 * | 1/2009 | Johnson et al. | 361/681 |
| 2010/0008028 A1 | 1/2010 | Richardson et al. | |
| 2010/0147737 A1 | 6/2010 | Richardson et al. | |
| 2010/0270188 A1 * | 10/2010 | Dotson | 206/320 |
| 2011/0073608 A1 | 3/2011 | Richardson et al. | |
| 2011/0159324 A1 * | 6/2011 | Huang et al. | 429/7 |
| 2011/0226545 A1 | 9/2011 | Richardson et al. | |
| 2011/0228458 A1 | 9/2011 | Richardson et al. | |
| 2011/0228459 A1 | 9/2011 | Richardson et al. | |
| 2011/0259788 A1 * | 10/2011 | Zeliff et al. | 206/701 |
| 2012/0018323 A1 | 1/2012 | Johnson et al. | |
| 2012/0074005 A1 | 3/2012 | Johnson et al. | |
| 2012/0262618 A1 * | 10/2012 | Weakly | 348/333.01 |

FOREIGN PATENT DOCUMENTS

| | | |
|---|---|---|
| FR | 2777758 | 10/1999 |
| WO | 0004437 | 1/2000 |

* cited by examiner

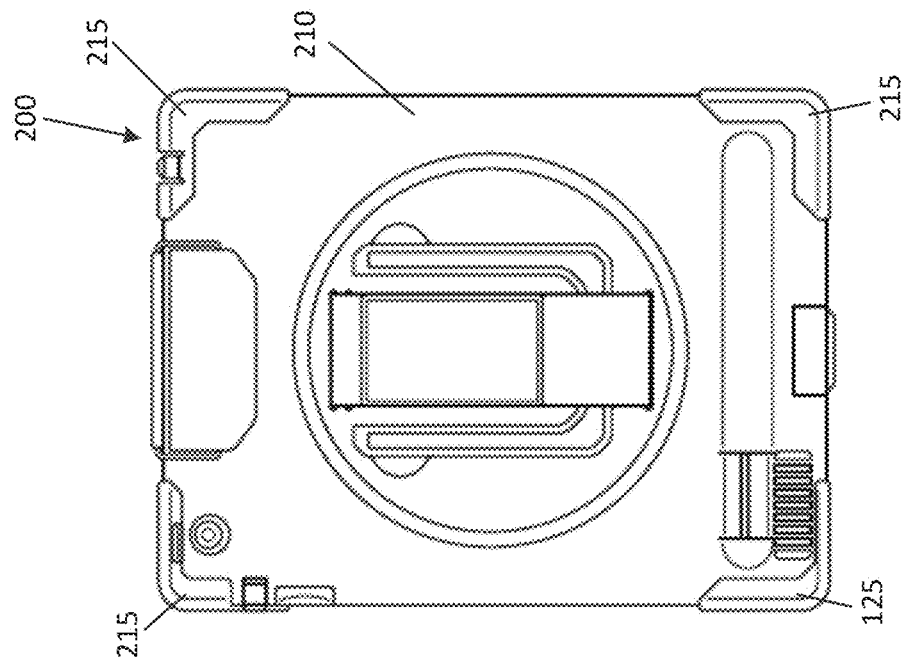
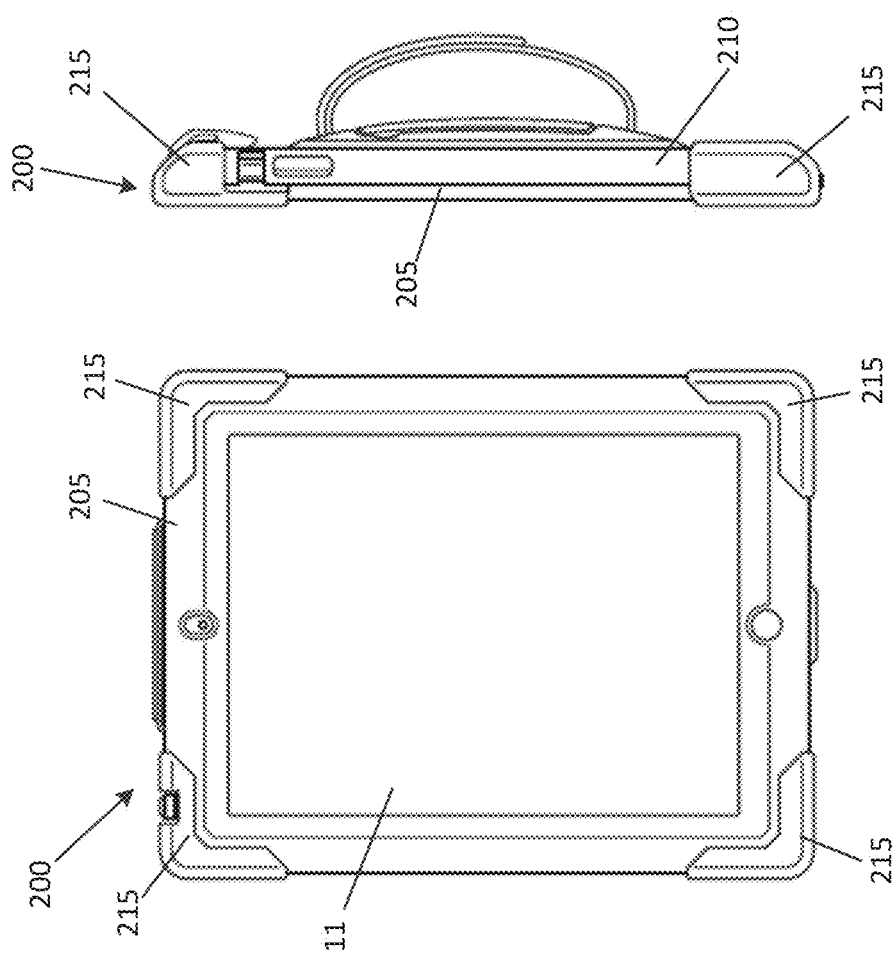

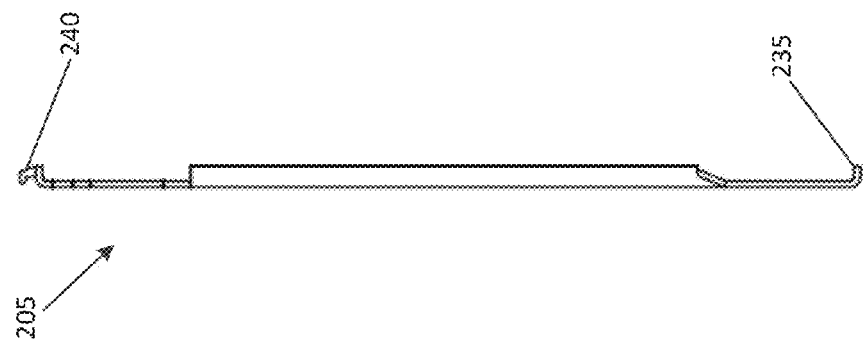
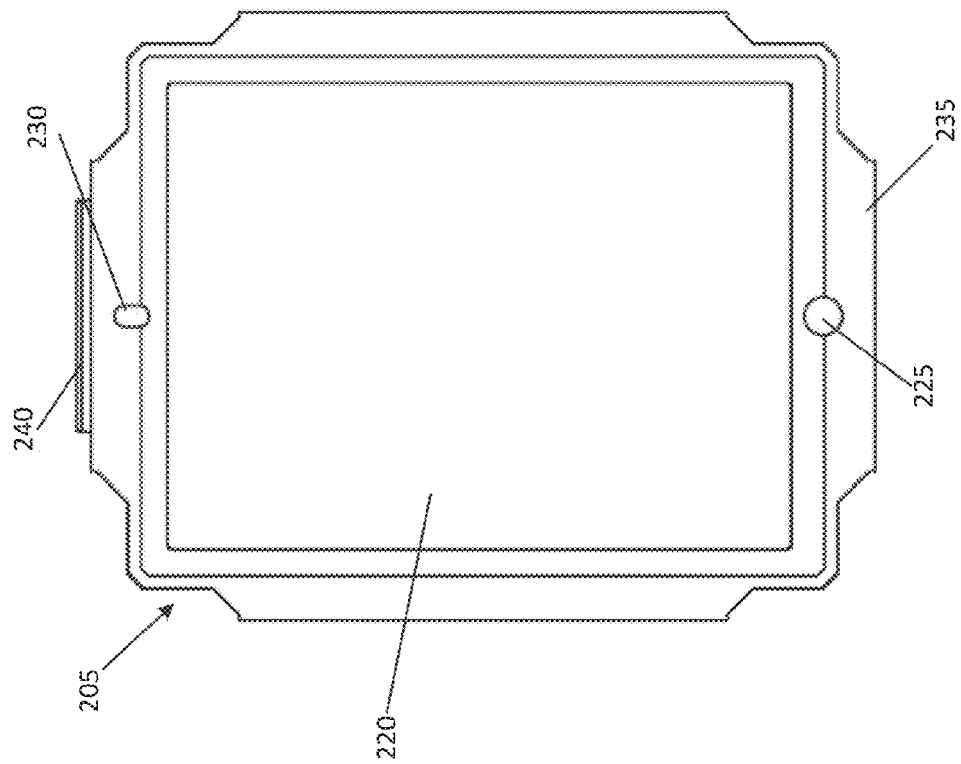

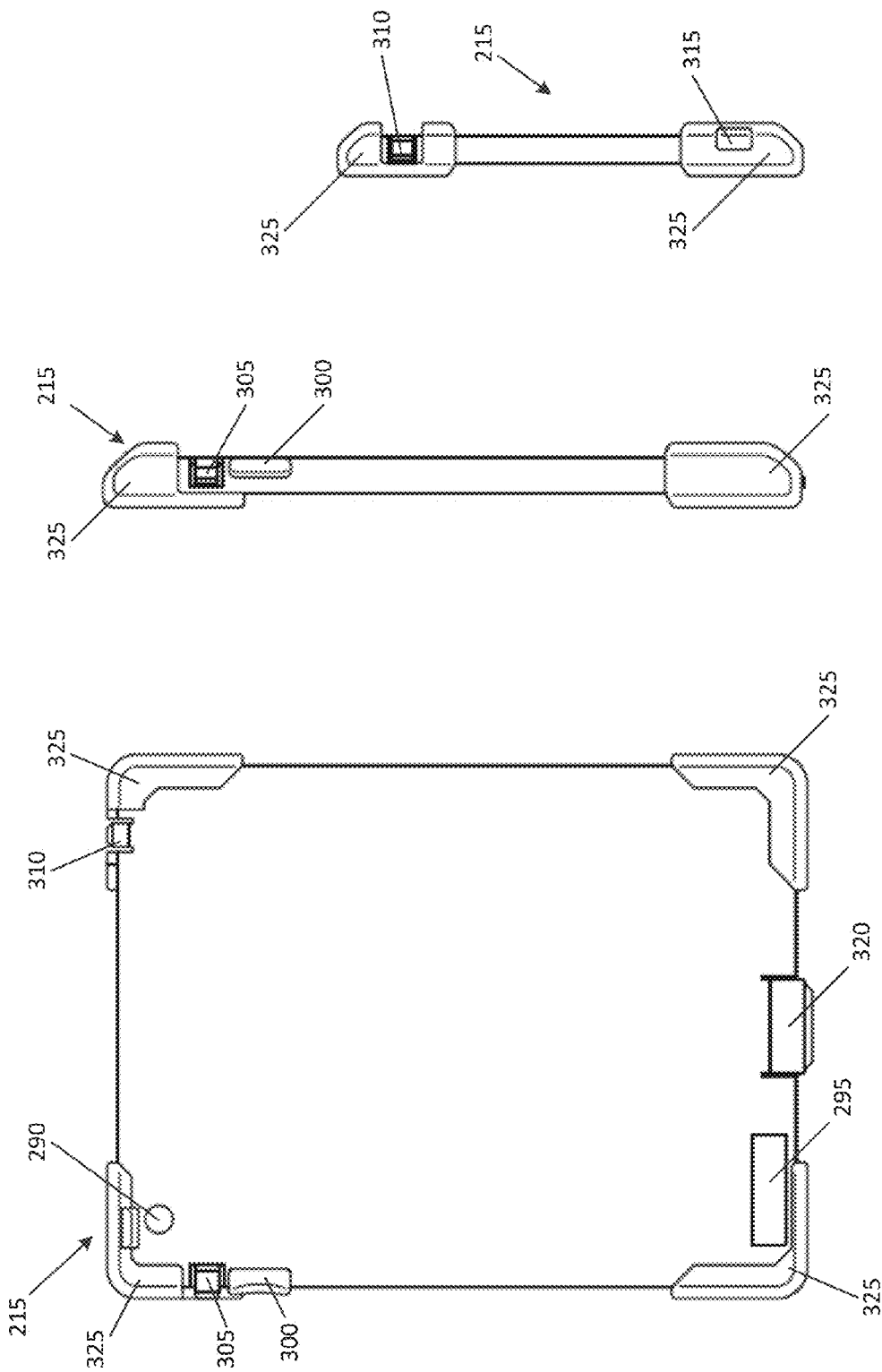

TABLET CASE

CROSS-REFERENCE TO RELATED APPLICATIONS

The present application claims priority to U.S. Provisional Application 61/604,958, filed Feb. 29, 2012, and U.S. Provisional Application 61/650,326, filed May 22, 2012, the entire contents of which are incorporated herein by reference.

BACKGROUND

The present invention relates to a case for a tablet or tablet computer. Cases for tablets offer protection to the tablet form scratches or other damage that may occur during normal operation of the tablet.

SUMMARY

In one embodiment, the invention provides a computer case for protecting a computer. The computer case comprising a front housing and a rear housing. The front housing including a first aperture operable to allow a user to operate the computer. The rear housing pivotally coupled to the front housing, the rear housing including a latch for securing the computer between the front housing and the rear housing, a battery receptacle for receiving a battery, an electrical interface for electrical communication with the computer, an electrical input, and a controller. Wherein the controller is operable to receive power from the battery, provide power to the computer via the electrical interface, receive an electrical signal from the electrical input, and output the electrical signal to the computer via the electrical interface.

In another embodiment, the invention provides a computer case for protecting a computer. The computer case comprising a front housing, a rear housing, and a sleeve. The front housing including a first aperture operable to allow a user to operate the computer. The rear housing including a latch and a handle. The sleeve including a plurality of bumpers, wherein the computer is placed within the sleeve and the sleeve is placed between the front and rear housing, and further wherein the latch secures the front housing and the rear housing in a closed position.

Other aspects of the invention will become apparent by consideration of the detailed description and accompanying drawings.

BRIEF DESCRIPTION OF THE DRAWINGS

FIG. 13 is a front view of a tablet case according to another embodiment of the invention.

FIG. 14 is a side view of the case of FIG. 13.

FIG. 15 is a rear view of the case of FIG. 13.

FIG. 16 is a front view of a front portion of the case shown in FIG. 13.

FIG. 17 is a side view of the front portion of the case shown in FIG. 13.

FIG. 21 is a front view of a sleeve for the case shown in FIG. 13.

FIG. 22 is a side view of the sleeve of the case shown in FIG. 13.

FIG. 23 is a top view of the sleeve of the case shown in FIG. 13.

Figure 1:
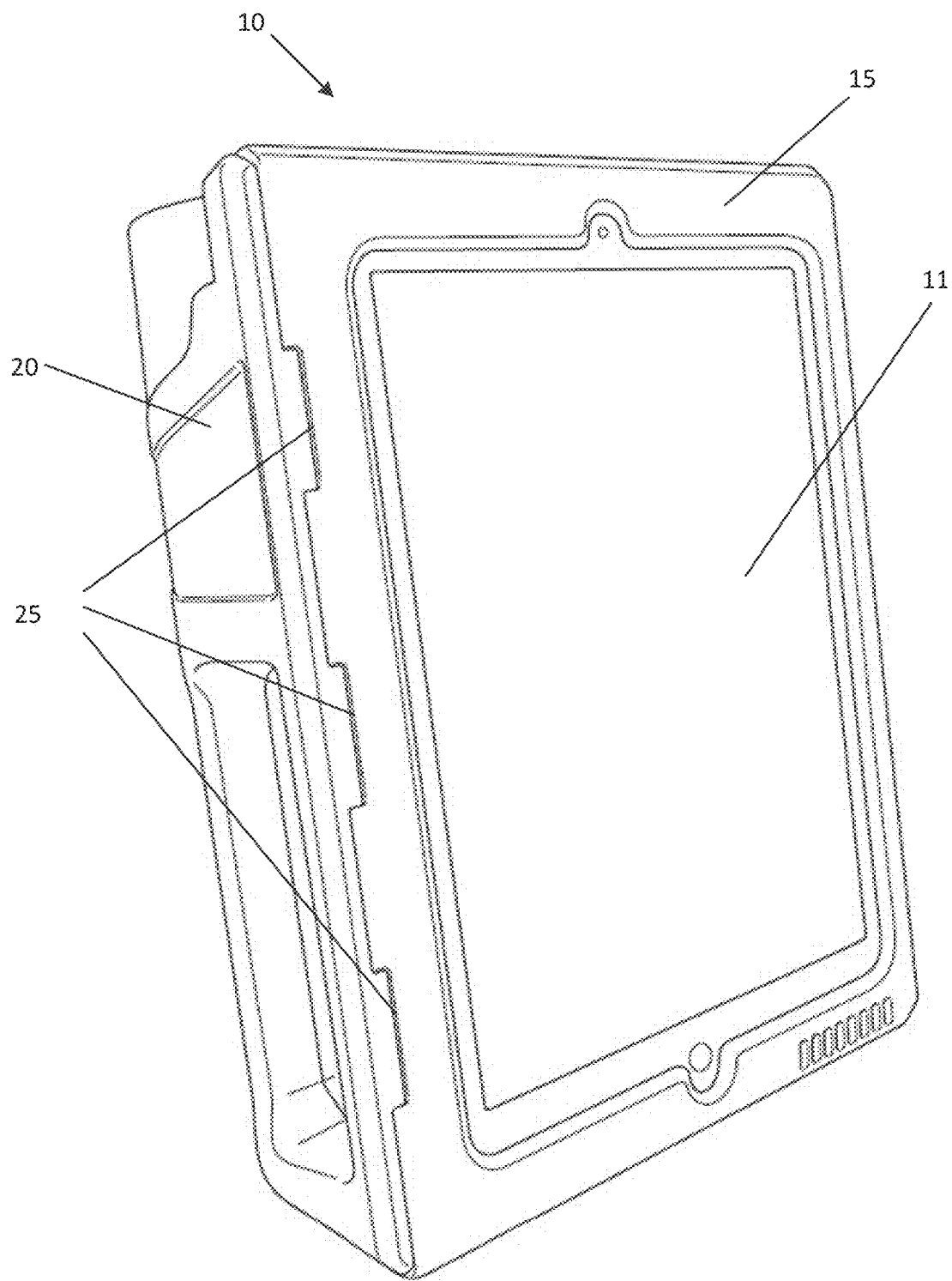
FIG. 1 illustrates a tablet case according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIGS. 1-12 illustrate a case 10 according to one embodiment of the invention. The case 10 is used with a tablet or tablet computer 11. A tablet is a personal computer, which receives input from a touch screen, rather than a physical keyboard or mouse. The case 10 includes a front portion or housing 15 and a rear portion or housing 20, and the front portion 15 is coupled to the rear portion 20 by a hinge 25. A user can operate the computer through an aperture 27 of the front portion 15.

Figure 2:
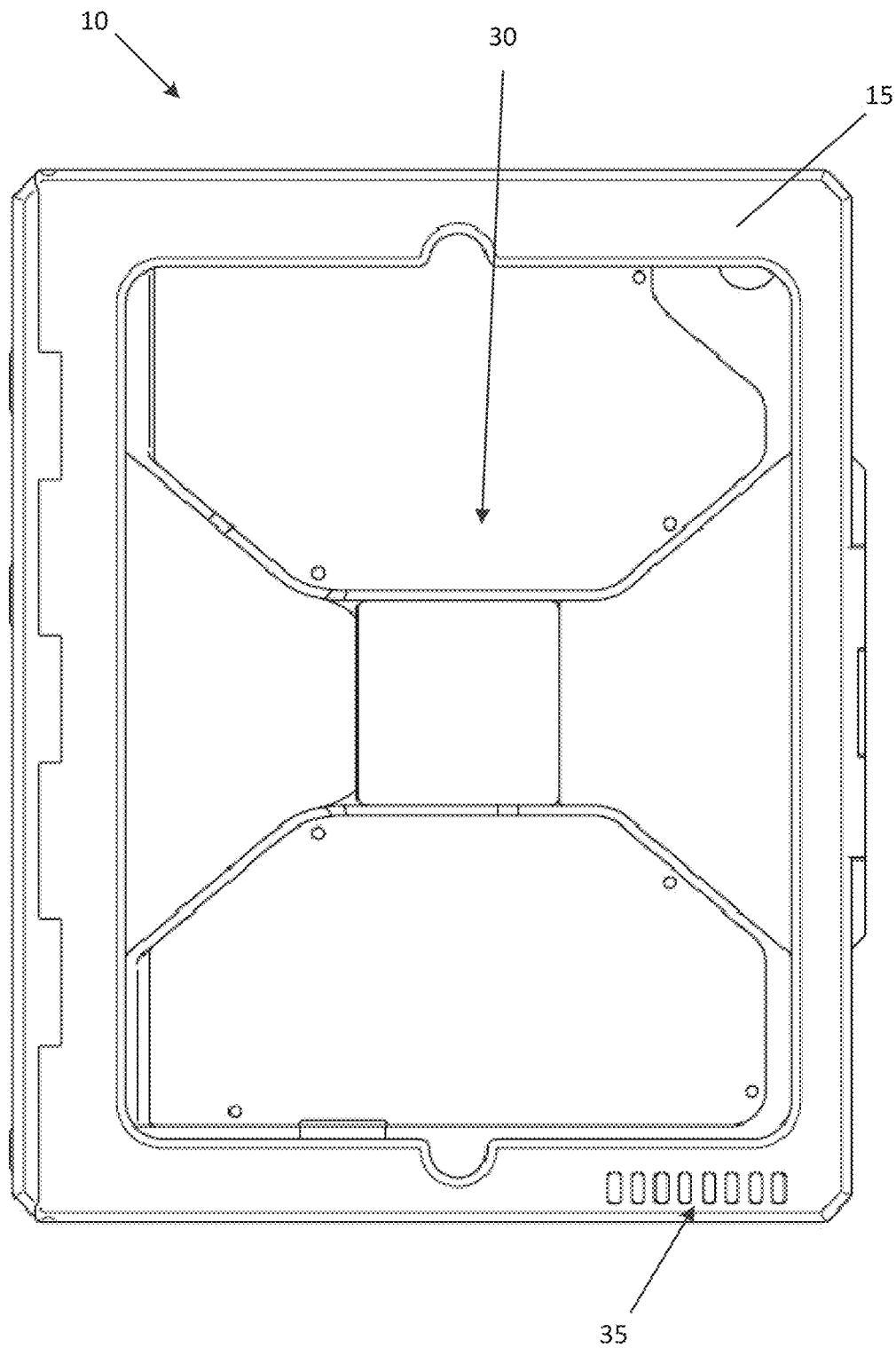
FIG. 2 illustrates a front portion of the case shown in FIG. 1.

Referring to FIGS. 2 and ,3 the front portion 15 of the case 10 includes a docking area 30 and speaker apertures 35. The docking area 30 is an area where a tablet is enclosed by the case 10. The speaker apertures 35 allow sound from the tablet's speaker (not shown) to exit from the case 10. With the case 10 in an open position, sound from the tablet speaker exits through the speaker apertures 35 after being channeled from a rear of the tablet toward a user by a sound channel 37 formed in the rear portion 20 of the case 10. Tablets often include speakers that are located in the rear of the tablet. Therefore, sound must be directed from the rear of the tablet out towards the user, or otherwise be muffled when the tablet is enclosed within the case 10. The sound channel 37 directs the sound from the rear of the tablet, and outputs the sound through the speaker apertures 35. In one embodiment the front portion 15 includes apertures to access buttons/switches of the tablet.

Figure 3:
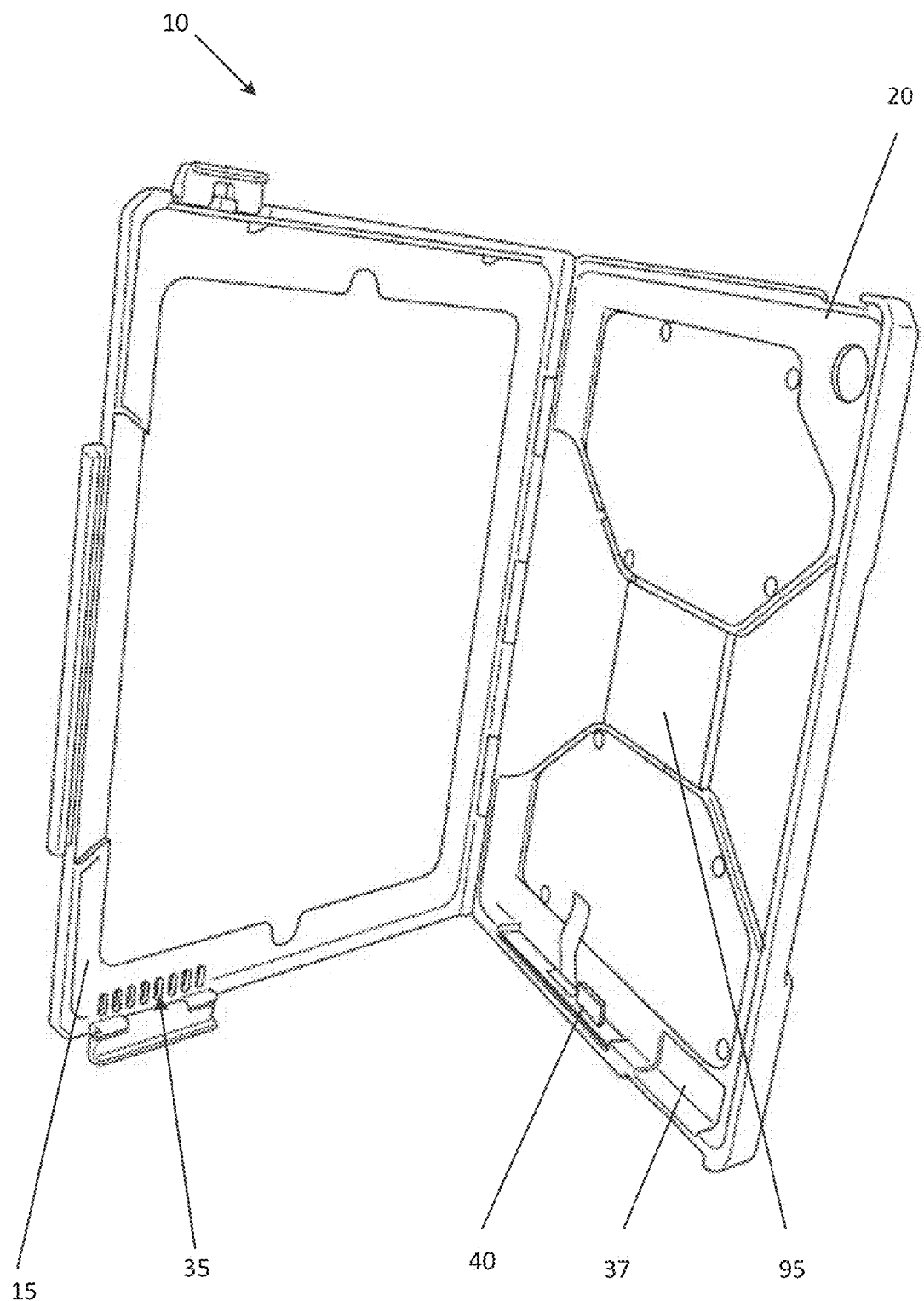
FIG. 3 illustrates the front portion of the case shown in FIG. 1, and in an open position.

The hinge 25 allows the front portion 15 to open with respect to the rear portion 20, and thereby provide access to the docking area 30. Once the case 10 is open, a tablet may be placed in the docking area 30. When placed in the docking area 30, the tablet connects to a dock connector 40. The dock connector 40 electrically connects the tablet to electrical components of the case 10, and will be discussed in further detail below. Once the case 10 is closed (FIGS. 1 and 2), latches 45 further couple the front portion 15 to the rear portion 20, thereby securing the tablet within the docking area 30 of the case 10. In the illustrated embodiment, the case 10 includes three latches 45. Along with the hinge 25, the latches 45 couple the front portion 15 to the rear portion 20 on all four sides of the case 10. Coupling the front portion 15 to the rear portion 20 on all four sides of the case 10 fully secures the tablet within the docking area 30, as well as creates a seal between the front portion 15 and the rear portion 20. In another embodiment, the case 10 has a removable panel rather than a hinge 25. The removable panel opens and the tablet is slid into the docking area 30 of the case 10. In another embodiment, the case 10 includes a rubberized bezel rather than a hinge 25. The rubberized bezel stretches to allow the tablet to be placed in the docking area 30 of the case 10. Also shown in FIG. 3 is a fan 95, which is included in the rear portion 20 and is discussed in further detail below.

Figure 4:
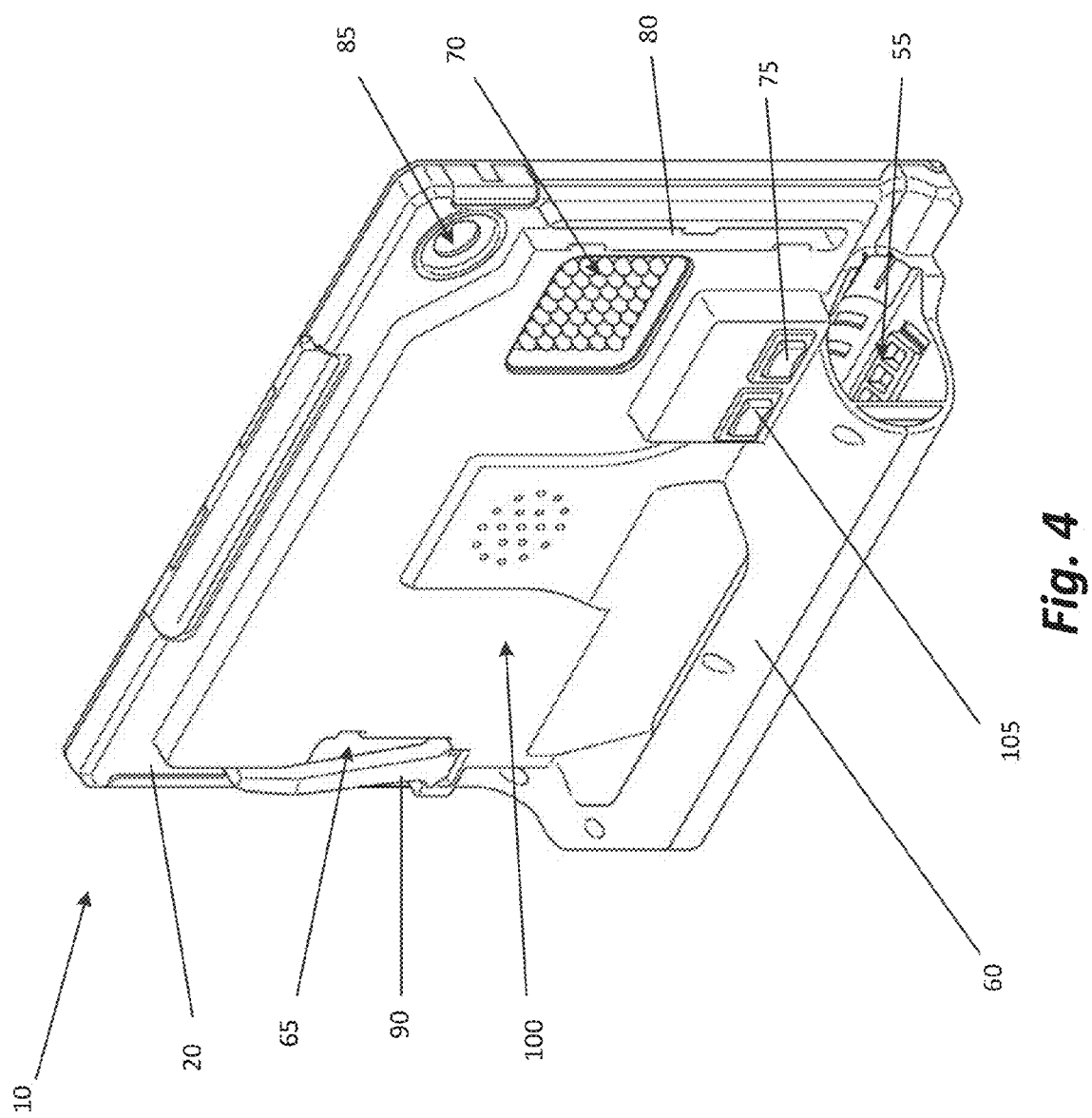
FIG. 4 illustrates a rear perspective view of the case shown in FIG. 1.
Figure 5:
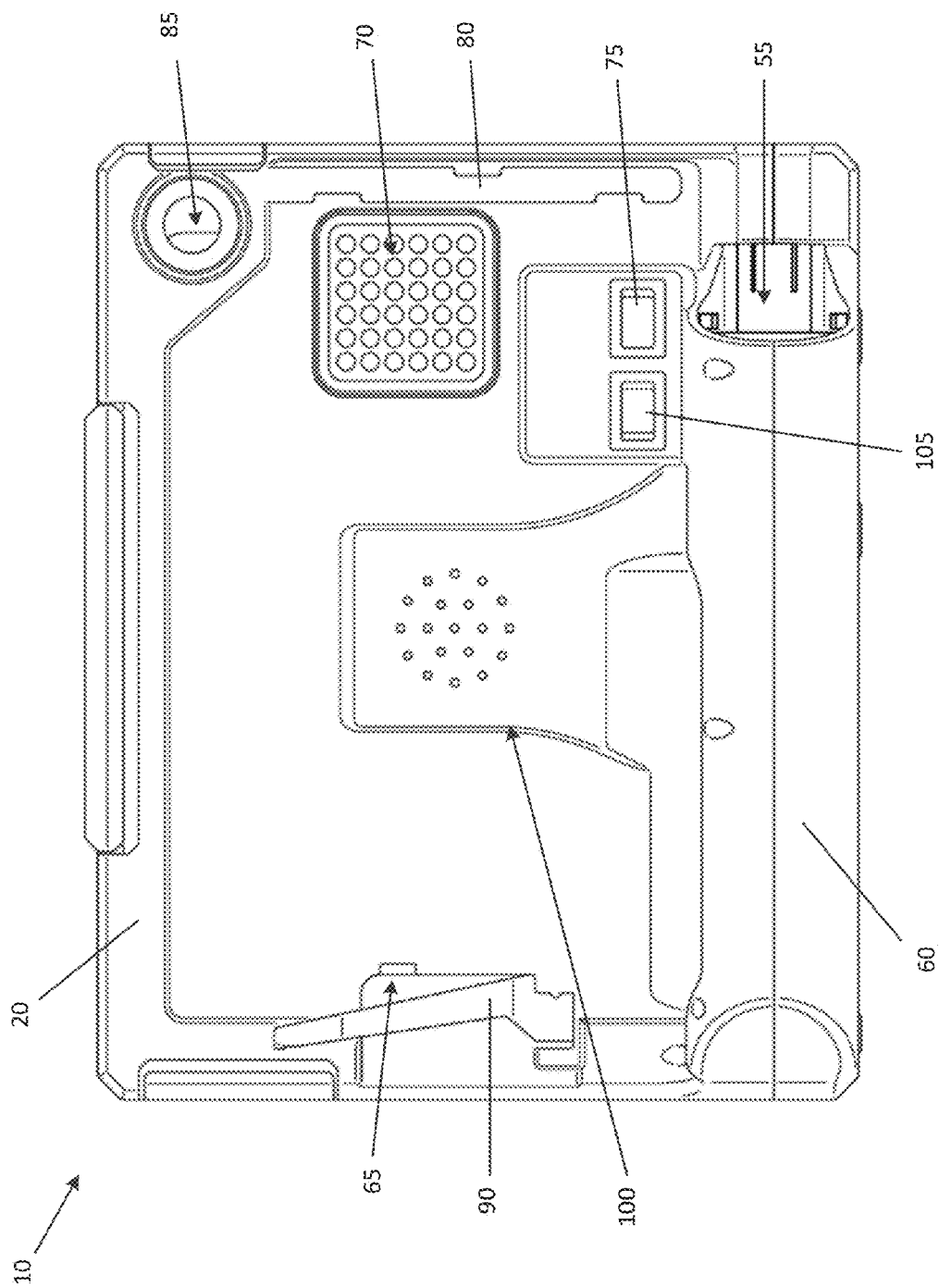
FIG. 5 illustrates a rear view of the case shown in FIG. 1.
Figure 6:
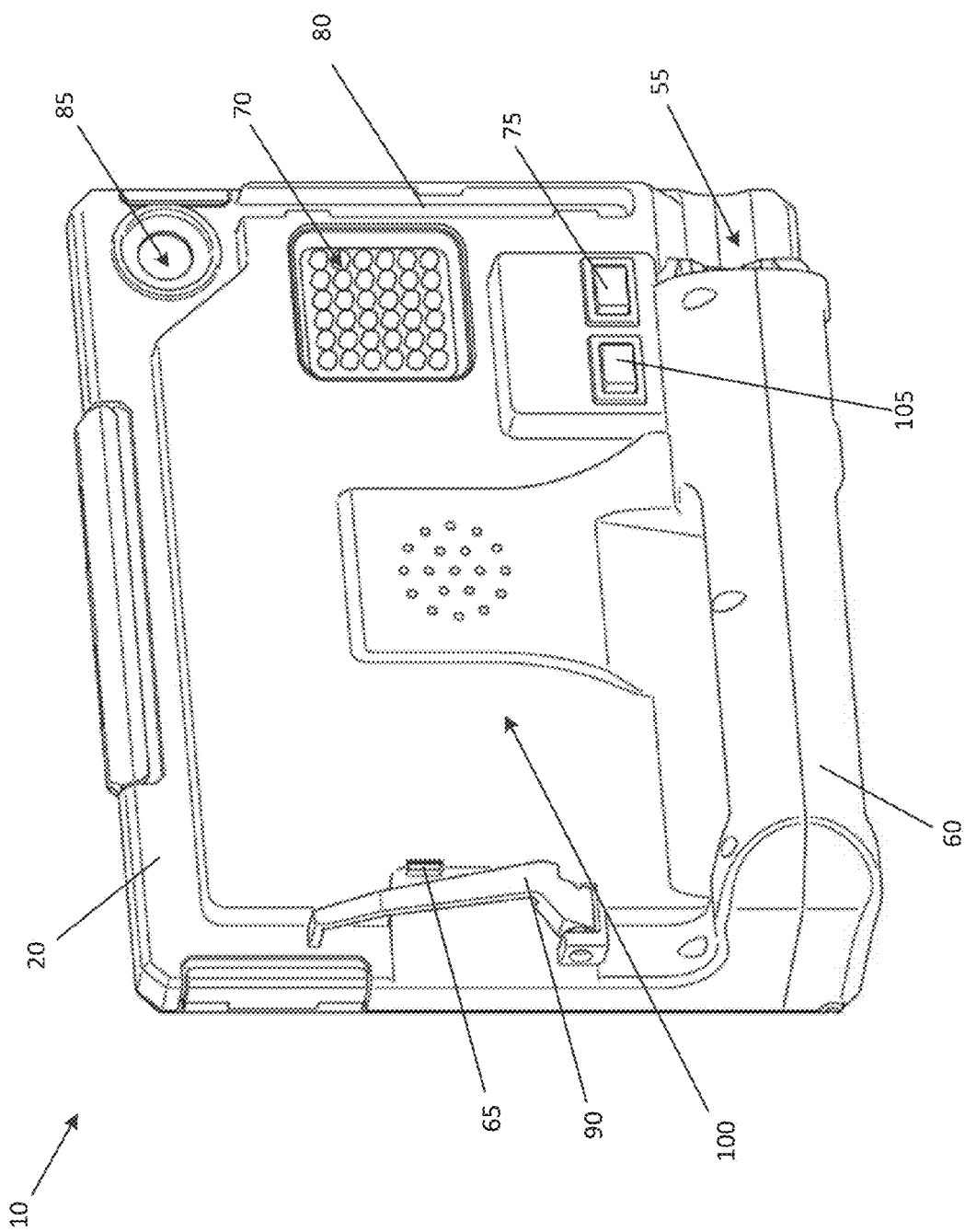
FIG. 6 illustrates another rear perspective view of the case shown in FIG. 1.

FIGS. 4-6 illustrates the rear portion 20 of the case 10. The rear portion 20 includes a controller 50 (FIG. 7), a battery receptacle 55, a handle 60, a USB port 65, an LED light array 70, and LED switch 75, a stylus holder 80, a camera aperture 85, a kickstand 90, the fan 95, air holes 100, and a fan switch 105.

Figure 7:
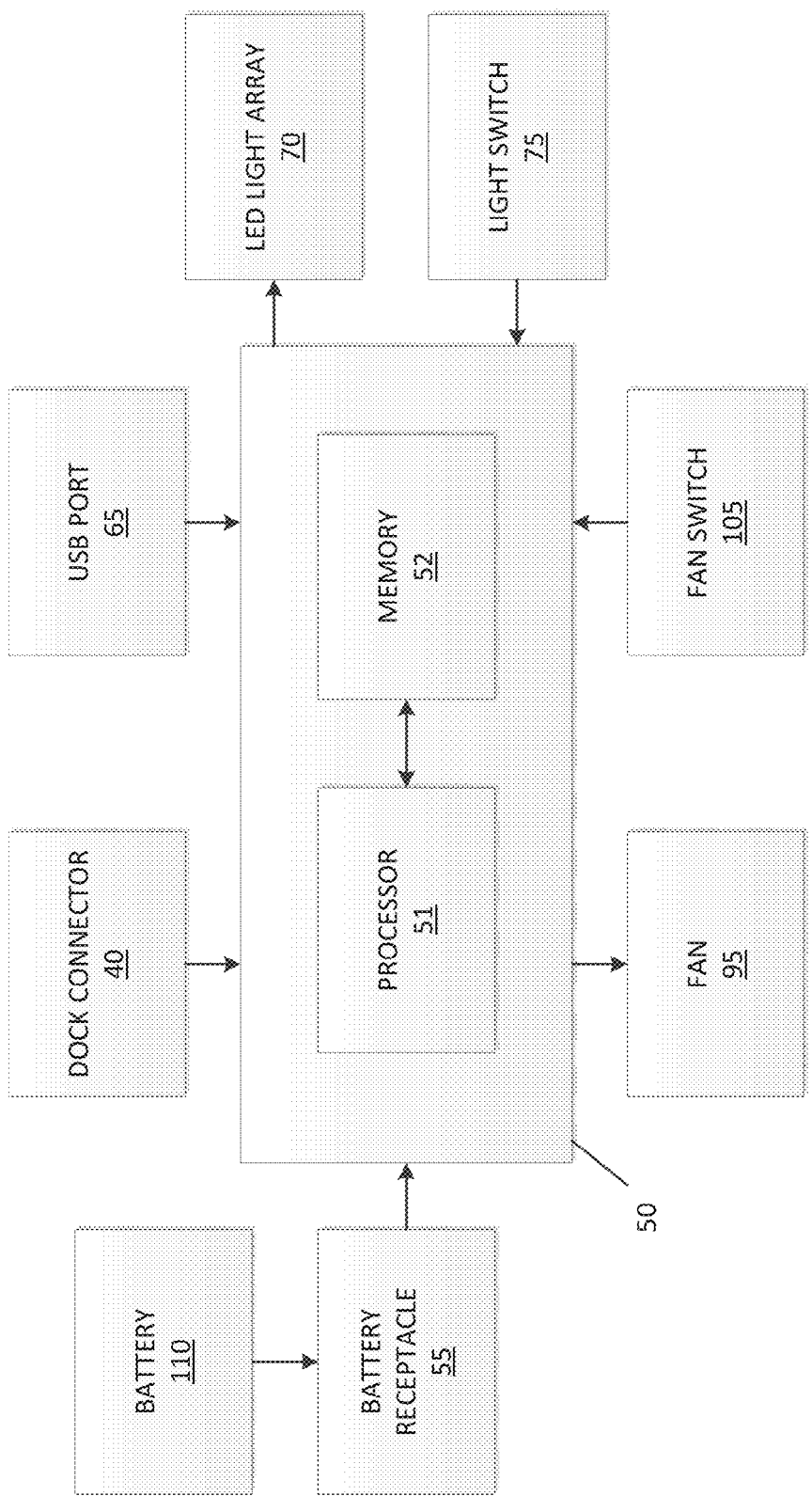
FIG. 7 illustrates a controller for the case shown in FIG. 1.

As illustrated in FIG. 7, the controller 50 is electrically and/or communicatively connected to a variety of modules or components of the case 10. For example, the illustrated controller 50 is connected to the dock connector 40, battery receptacle 55, USB port 65, LED light array 70, LED switch 75, fan 95, and fan switch 105. The controller 50 includes combinations of hardware and software that are operable to, among other things, control the operation of components of the controller 50.

In some embodiments, the controller 50 includes a plurality of electrical and electronic components that provide power, operational control, and protection to the components and modules within the controller 50 and/or case 10. For example, the controller 50 includes, among other things, a processing unit 51 (e.g., a microprocessor, a microcontroller, or another suitable programmable device) and a memory unit 52. In some embodiments, the processing unit 51 includes, among other things, a control unit, an arithmetic logic unit ("ALU"), and a plurality of registers. The memory unit 52 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 51 is connected to the memory 52 and executes software instructions that are capable of being stored in a RAM of the memory 52 (e.g., during execution), a ROM of the memory 52 (e.g., on a generally permanent basis), or another non-transitory computer readable medium such as another memory or a disc. Software included in the implementation of the case 10 can be stored in the memory 52 of the controller 50. The software includes, for example, firmware, one or more applications, program data, filters, rules, one or more program modules, and other executable instructions. The controller 50 is configured to retrieve from the memory 52 and execute, among other things, instructions related to the control processes and method described herein. In other constructions, the controller 50 includes additional, fewer, or different components.

The case 10 further includes a battery 110. The battery 110 is placed within the battery receptacle 55, and is locked into position. The battery 110 provides DC power to the controller 102. The tablet receives power from the battery 110 when connected to the dock connector 40, thereby extending a charge of the internal tablet battery. In some embodiments, the battery 110 is a rechargeable lithium-ion battery. In other embodiments, the battery 110 may have a chemistry other than lithium-ion such as, for example, nickel cadmium, nickel metal-hydride, etc. Additionally or alternatively, the battery 110 may be a non-rechargeable battery. In some embodiments, the battery 110 is a power tool battery pack including a pack housing containing one or more battery cells and latching mechanisms for selectively securing the battery 110 to the battery receptacle 55. The battery 110 has a nominal voltage (e.g., 12-volts, 18-volts, etc.) which is outputted to the controller 50. In the illustrated embodiment, the battery receptacle 55 is integrated into the case handle 60, which is an ergonomic bale style handle. The handle 60 enables a secure single hand hold on the case 10, allowing the user to operate the tablet with one hand while holding the tablet with the other.

The USB port 65 allows the user to connect the tablet to an external power source, personal computer, or other USB devices, while the tablet remains enclosed within the case 10. The USB port 65 is connected to the dock connector 40 via the main circuit. In one embodiment, the USB port 65 is a mini USB port, however, the USB port 65 can be any type or size of a Universal Serial Bus port.

The LED light array 70 provides a light source, which may be used as a camera flash for the tablet camera or as a flashlight. In the illustrated embodiment, the LED light array 70 includes multiple LED lights. In another embodiment, the LED light array 70 includes a single LED light or other light source. The LED switch 75 controls operation of the LED light array 70. In some embodiments, the LED switch 75 is an on/off switch, which either powers the LED light array 70 on or off. In another embodiment the LED switch 75 is a toggle switch, which toggles between different functions of the LED light array 70, such as on/off, a strobe function, or brightness of the LED light array 70. In the illustrated embodiment, the controller 50 receives an ON light signal from the LED switch 75. The controller 50 activates the LED light array 70 in response to receiving the ON light signal. In another embodiment, the LED switch 75 is connected in series between the controller 50 and the LED light array 70. In such an embodiment, when in the ON position, the LED switch 75 is operable to allow current to the LED light array 70, thus turning the LED light array 70 on. When in the OFF position, the LED switch 75 is operable to prevent current to the LED light array 70.

The stylus holder 80 holds a tablet stylus or similar writing utensil, which is used to assist navigating or provides more precision when using touch screen tablets. The camera aperture 85 allows a camera of the tablet to be used while the tablet is contained within the case 10. The camera aperture 85 may include a metal ring to accommodate after-market magnetic lenses, which may be used with the tablet camera.

Figure 8:
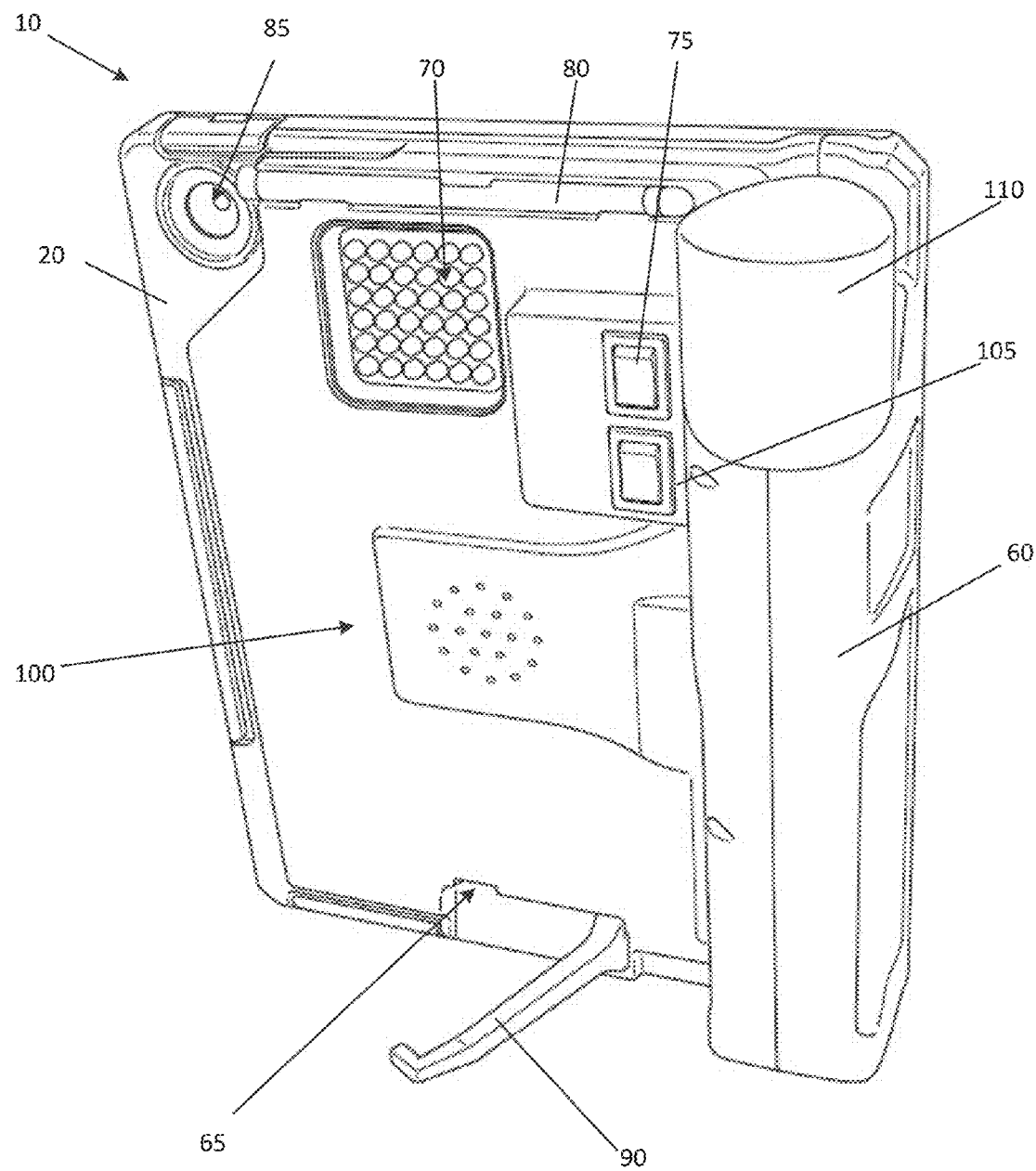
FIG. 8 illustrates a kickstand of the case shown in FIG. 1, the kickstand in an extended position.
Figure 9:
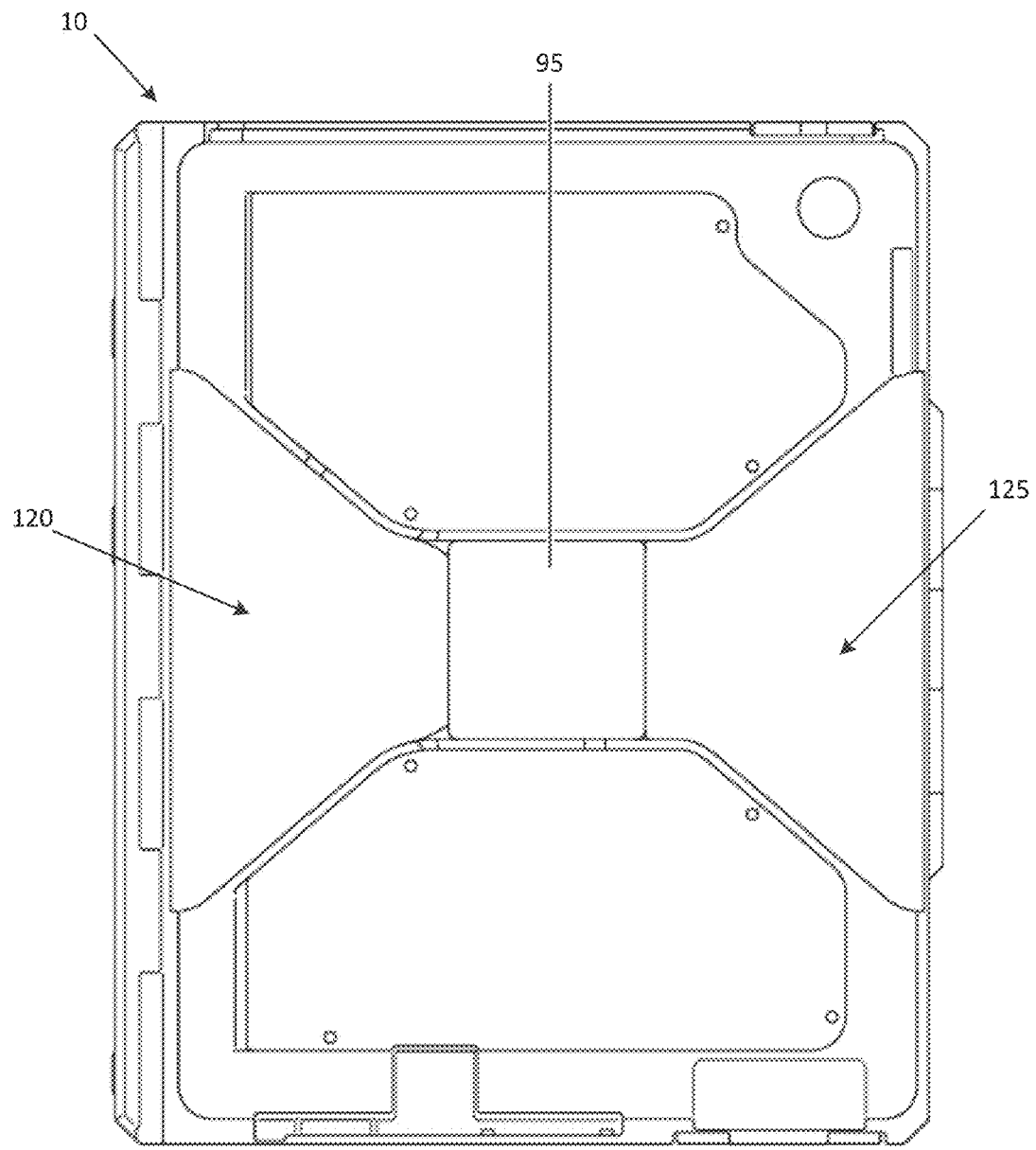
FIG. 9 illustrates the case shown in FIG. 1 with the front portion removed.

FIG. 8 illustrates the kickstand 90 of the case in an extended position. The kickstand 90 is placed in the extended position when used to support the case 10 in a portrait orientation. Otherwise, the kickstand 90 is retracted into the case 10, as shown in FIGS. 4, 5, and 6. When retracted into the case 10, the kickstand 90 does not restrict access to the USB port 65. In one embodiment, the kickstand 90 uses a ball detent mechanism to lock the kickstand 90 in the extended and retracted positions.

Referring to FIGS. 3-4 and 9-10, the fan 95, air holes 100, air slits 110, 115, and air channels 120, 125 are used to keep the tablet at a desirable operating temperature. The fan 95 pulls cool air in through the air slit 110 using the air channel 120. The cool air is then channeled across the rear of the tablet, thereby cooling the tablet to an optimal operating temperature. The air exits through the air slit 115 via the air channel 125. Air holes 100 may be used as an additional air inlet or outlet, for example if either or both air slits 110, 115 become restricted. The seal created when the front portion 15 and rear portion 20 are latched closed allows the air to flow as described above, without air leakage occurring between the two portions 15, 20.

The fan switch 105 controls operation of the fan 95. In some embodiments, the fan switch 105 is an on/off switch, which either powers the fan 95 on or off. In another embodiment the fan switch 105 is a toggle switch, or knob, which controls the operating speed of the fan 95. In the illustrated embodiment, the controller 50 receives an ON fan signal from the fan switch 105. The controller 50 activates the fan 95 in response to receiving the ON fan signal. In another embodiment, the fan switch 105 is connected in series between the controller 50 and the fan 95. In such an embodiment, when in the ON position, the fan switch 105 is operable to allow current to the fan 95, thus turning the fan 95 on. When in the OFF position, the fan switch 105 is operable to prevent current to the fan 95.

Figure 10:
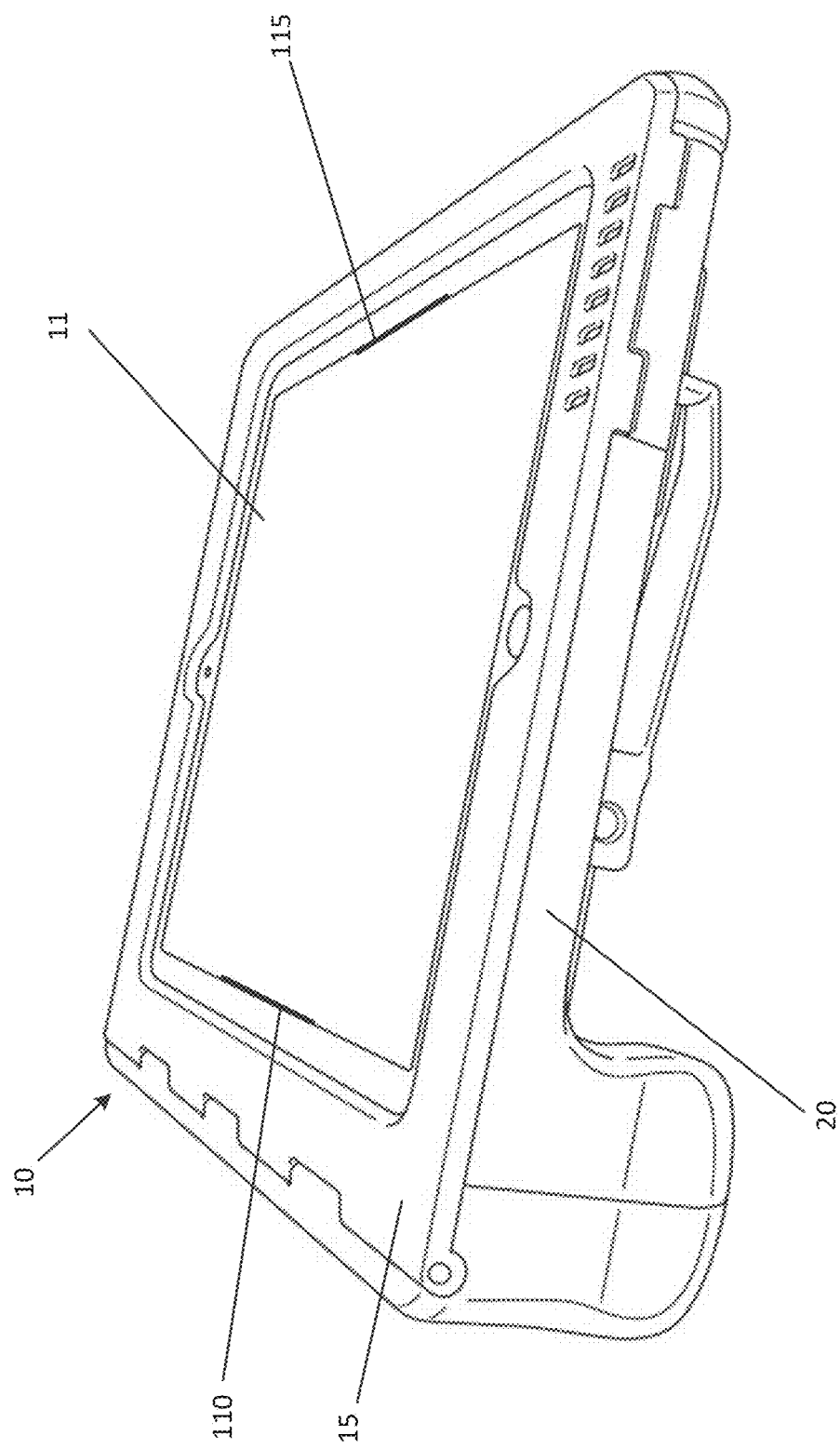
FIG. 10 illustrates the case of FIG. 1 oriented in a typing position.
Figure 11:
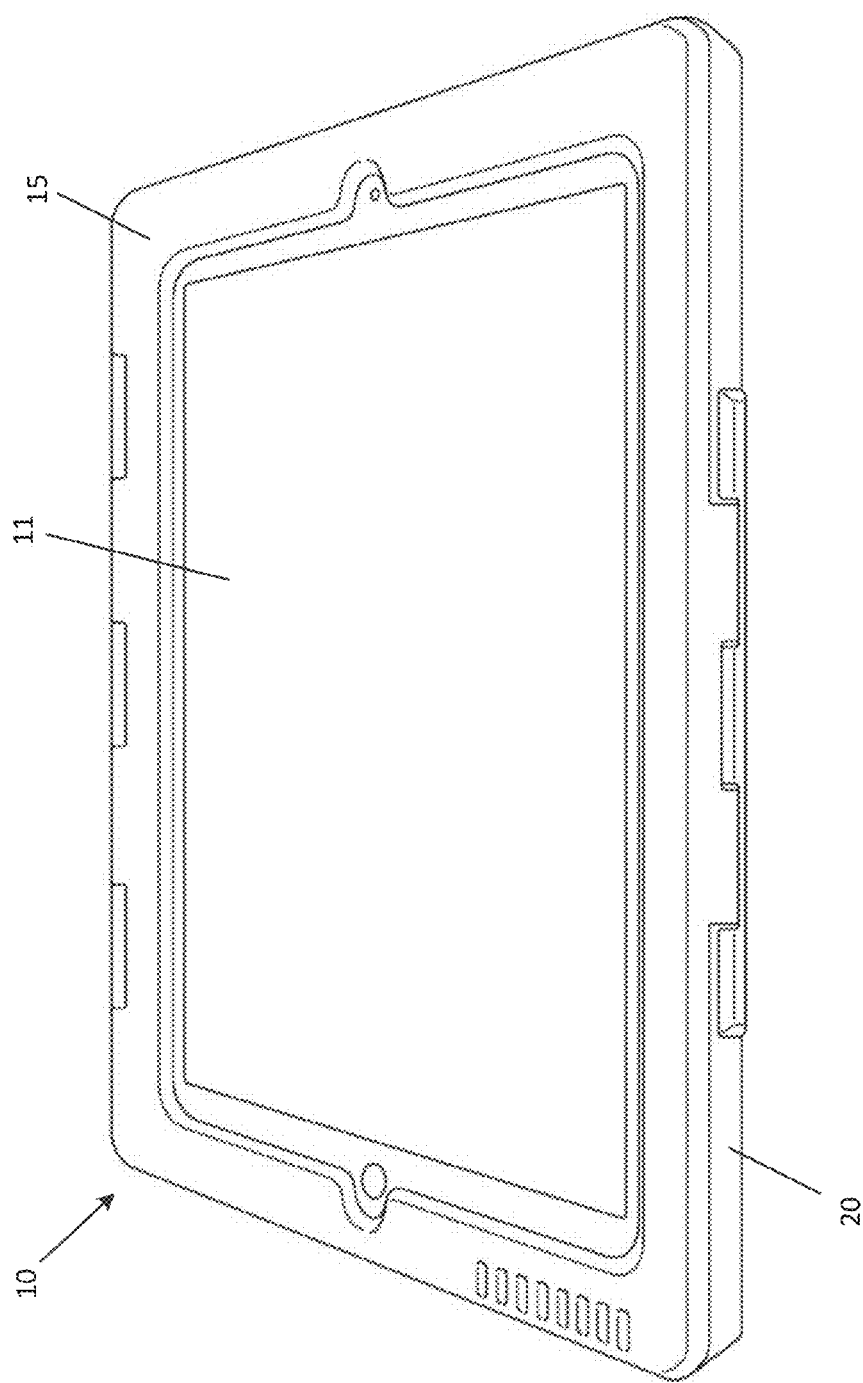
FIG. 11 illustrates the case of FIG. 1 oriented in the typing position.

FIGS. 10 and 11 illustrate the case 10 in a typing position. When in the typing position the case 10 is laid on the rear portion 20. When the battery 110 is placed within the battery receptacle 55, the battery 110 and handle 60 form a continuous support surface. The handle 60 and battery 110 prop up one end of the case 10, resulting in the case 10 resting at an angle between approximately 10 degrees and approximately 15 degrees.

Figure 12:
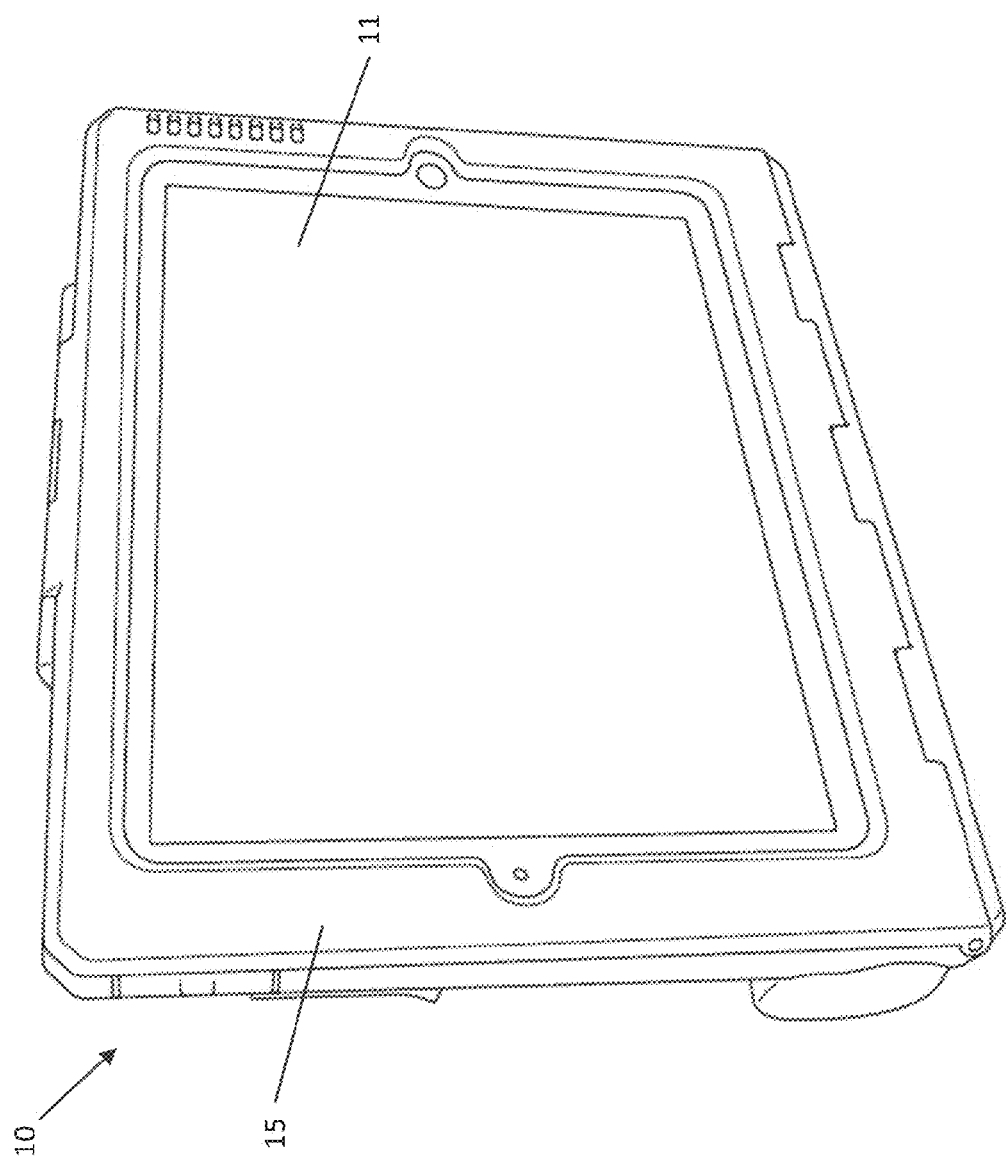
FIG. 12 illustrates the case of FIG. 1 oriented in a landscape position.

FIG. 12 illustrates the case 10 in a landscape orientation. In this orientation, the handle 60 supports the case 10, rather than the kickstand 90. In one embodiment, the case 10 is at an angle between approximately 80° and approximately 85°.

In some embodiments, the handle 60 of the case 10 includes one or more buttons to control operation of the tablet, including for example, taking photos, controlling the volume, etc. The buttons communicate with the tablet via the dock connector 40.

FIGS. 13-29 illustrate a case 200 according to another embodiment of the invention, which is used to protect the tablet or tablet computer 11 from damage. The case 200 includes a front portion 205, a rear portion 210, and a sleeve 215. In one embodiment the front portion 205 and the rear portion 210 are composed of plastic, or a similar rigid material, while the sleeve 215 is composed of silicone, or a similar flexible material. In other embodiments, the front portion 205 and rear portion 210 are composed of wood, metal, or other known materials, and the sleeve 215 is composed of rubber or a similar elastic polymer.

FIGS. 16 and 17 illustrate the front portion 205 of the case 200. The front portion 205 includes a clear protective lens 220, a push-button aperture 225, a front-camera aperture 230, a tab 235, and a hook 240. The clear protective lens 220 protects the screen of the tablet 11 while allowing full use of the tablet touch screen. In the illustrated embodiment, the clear protective lens 220 is composed of polyurethane, or a similar material that allows full use of the tablet touch screen. The push-button aperture 225 allows the user to operate a push button of the tablet 11, and the front-camera aperture 230 allows a front camera of the tablet to be operated. The tab 235 and hook 240 are explained in greater detail in connection with enclosing a tablet 11 within the case 200.

Figure 19:
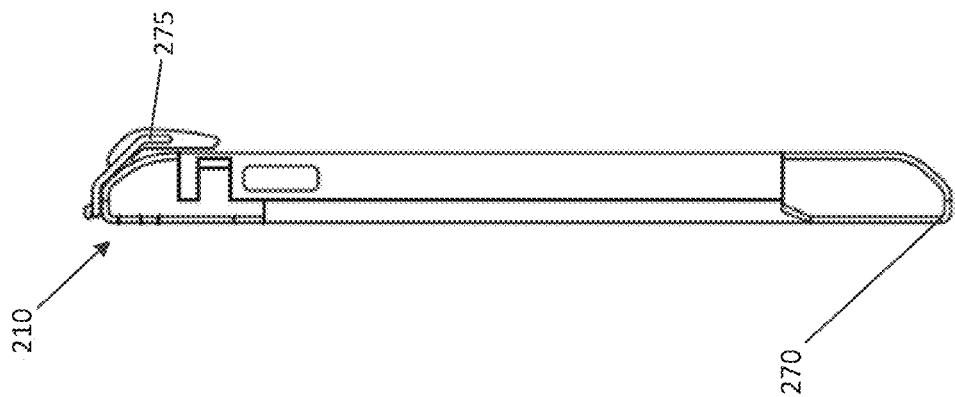
FIG. 19 is a side view of the rear portion of the case shown in FIG. 13.
Figure 18:
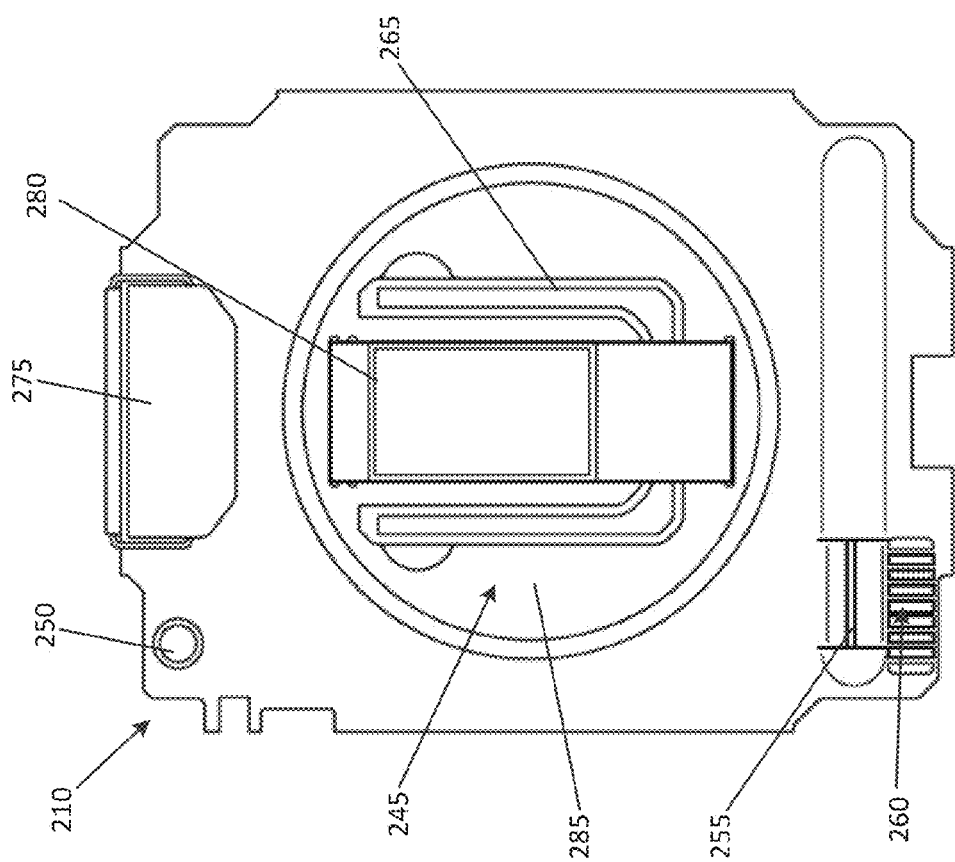
FIG. 18 is a rear view of a rear portion of the case shown in FIG. 13.

FIGS. 18 and 19 illustrate the rear portion 210 of the case 200. The rear portion 210 includes a handle 245, a rear-camera aperture 250, an accessory-attachment point 255, speaker apertures 260, a stand 265, a latch 270, and a buckle 275. The handle 245 includes a strap 280 and a handle base 285. The strap 280 allows a user to hold the case 200 using one-hand. The handle base 285 allows rotation of the case 200 three-hundred and sixty degrees with respect to the handle 245. This allows the user to hold the case 200 using the strap 280, while the case 200 can pivot three-hundred and sixty degrees around the handle base 285.

The rear-camera aperture 250 allows a rear camera of the tablet 11 to be operated. The accessory-attachment point 255 allows attachment of various accessories to the case 200 (e.g., a stylus). In another embodiment discussed in further detail below, the accessory-attachment point 255 is used with a shoulder strap for hands-free carrying of the case 200. The speaker apertures 260 allow sound from a speaker of the tablet 11 to exit from the case 200.

Figure 20A:
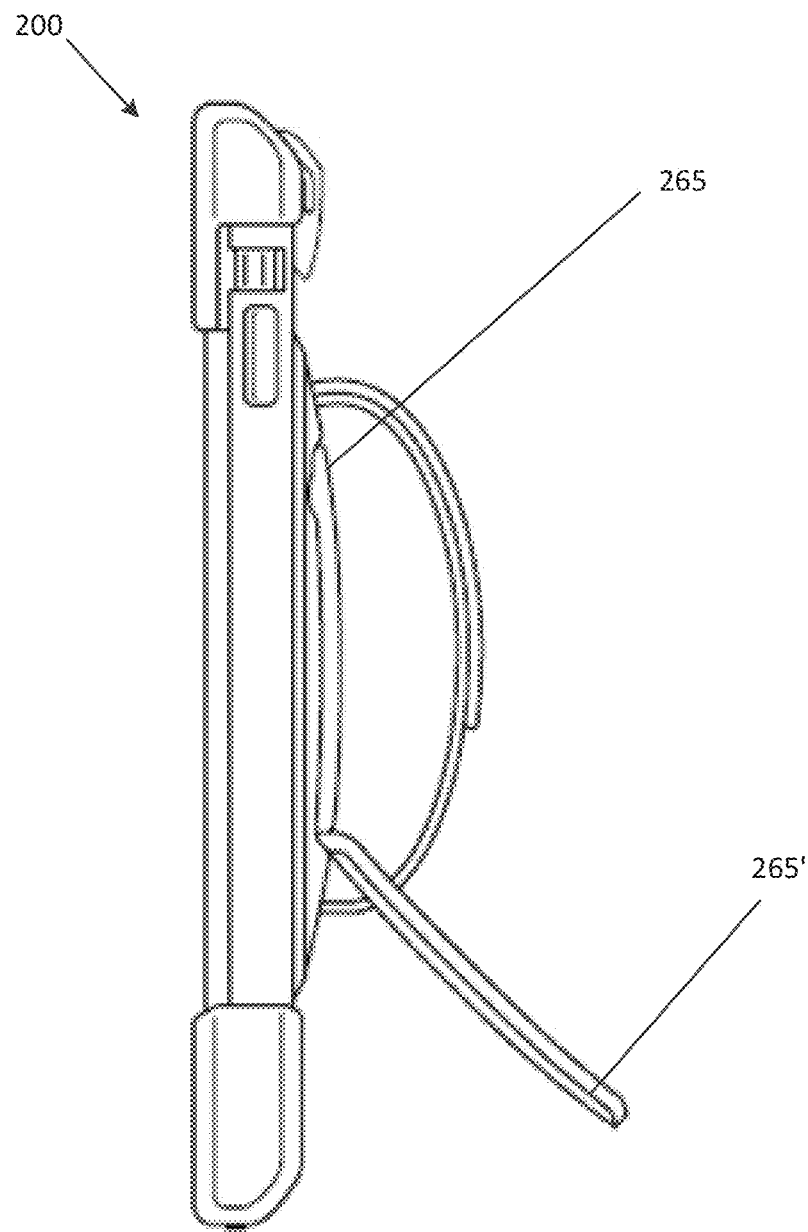
FIGS. 20A-20C illustrate a stand for the case shown in FIG. 13.
Figure 20C:
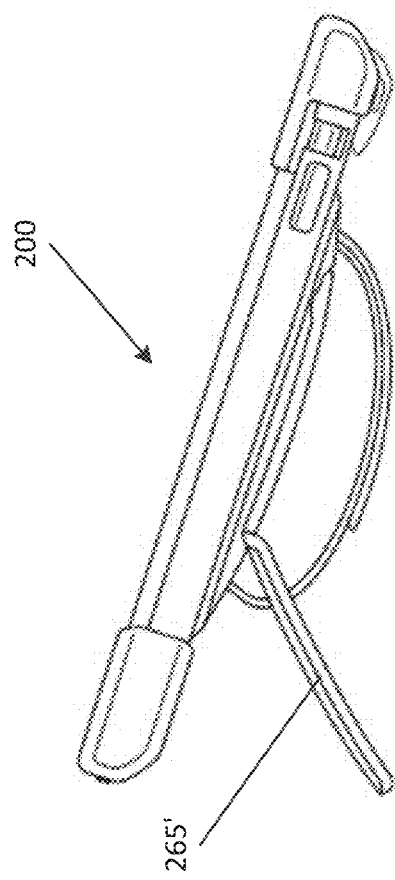
Figure 20B:
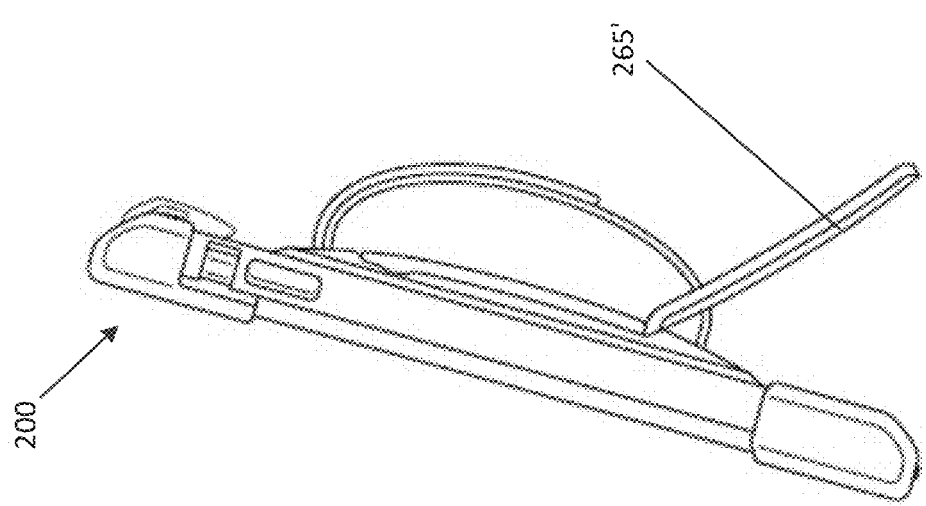

As shown in FIGS. 20A-20C the stand 265 supports the case 200 in a portrait orientation. The stand 265' is placed in an extended position when used to support the case 200 in a portrait orientation. Otherwise, the stand 265 is retracted into the case 200. Both positions of the stand 265 are shown in FIGS. 20A-20C. As shown in FIG. 20B, the stand 265 supports the case 200 in a portrait orientation at an approximately 60° angle. As shown in FIG. 20C, the stand 265 supports the case 200 in a portrait orientation at an approximately 30° angle. The stand 265 may also support the case 200 in a landscape orientation in a similar fashion by rotating the position of the handle base 285 approximately 90° from the position, in either direction, shown in FIG. 18. Although shown in FIG. 18 as retracted into the handle base 285, in other embodiments the stand 265 retracts into other areas of the rear portion 210 of the case 200.

FIGS. 21-23 illustrate the sleeve 215 of the case 200. The sleeve 215 includes a sleeve rear-camera aperture 290. The sleeve rear-camera aperture aligns with the rear-camera aperture 250 (FIG. 18) of the rear portion 210 of the case 200. The sleeve rear-camera aperture 290, along with the rear-camera aperture 250, allows the rear camera of the tablet 11 to be operated.

The sleeve 215 further includes a sleeve speaker aperture 295. The sleeve speaker aperture 295 aligns with the speaker apertures 260 (FIG. 18) of the rear portion 210 of the case 200. The sleeve speaker aperture 295, along with the speaker apertures 260, allow sound from a speaker of the tablet 11 to exit from the case 200.

The sleeve 215 further includes a volume-button boot 300. In some embodiments, the volume-button boot 300 is located on a side of the sleeve 215. The volume-button boot 300 allows the user to operate the volume controls of the tablet 11, while protecting the volume controls from the outside environment.

The sleeve 215 further includes a switch door 305. In some embodiments, the switch door 305 is located on the side of the sleeve 215. The switch door 305 has an open position and a closed position. When in the open position, the switch door 305 allows access to one or more switches of the tablet 11. When in the closed position, the switch door 305 prevents access to the switches and protects the switches from the outside environment.

The sleeve 215 further includes a headphone-jack door 310. In some embodiments, the headphone-jack door 310 is located on the top of the sleeve 215. The headphone-jack door 310 has an open position and a closed position. When in the open position, the headphone-jack door 310 allows access to a headphone jack of the tablet 11. When in the closed position, the headphone-jack door 310 prevents access to the headphone-jack and protects the head-phone jack from the outside environment.

The sleeve 215 further includes a button boot 315. In some embodiments, the button boot 315 is located on the top of the sleeve 215. The button boot 315 allows the user to operate a button, such as a power button or lock button, of the tablet 11, while protecting the button from the outside environment.

The sleeve 215 further includes a dock-connector door 320. In some embodiments, the dock-connector door 320 is located on the bottom of the sleeve 215. The dock-connector door 320 has an open position and a closed position. When in the open position, the dock-connector door 320 allows access to a port, such as a dock-connector, of the tablet 11. When in the closed position, the dock-connector door 320 prevents access to the port and protects the port from the outside environment.

The sleeve 215 further includes impact bumpers 325. The impact bumpers 325 protect the tablet 11 from impact, such as impact from a drop or a fall. The impact bumpers are thicker areas of the sleeve 215, which cover the corners of the tablet 11.

Figure 24:
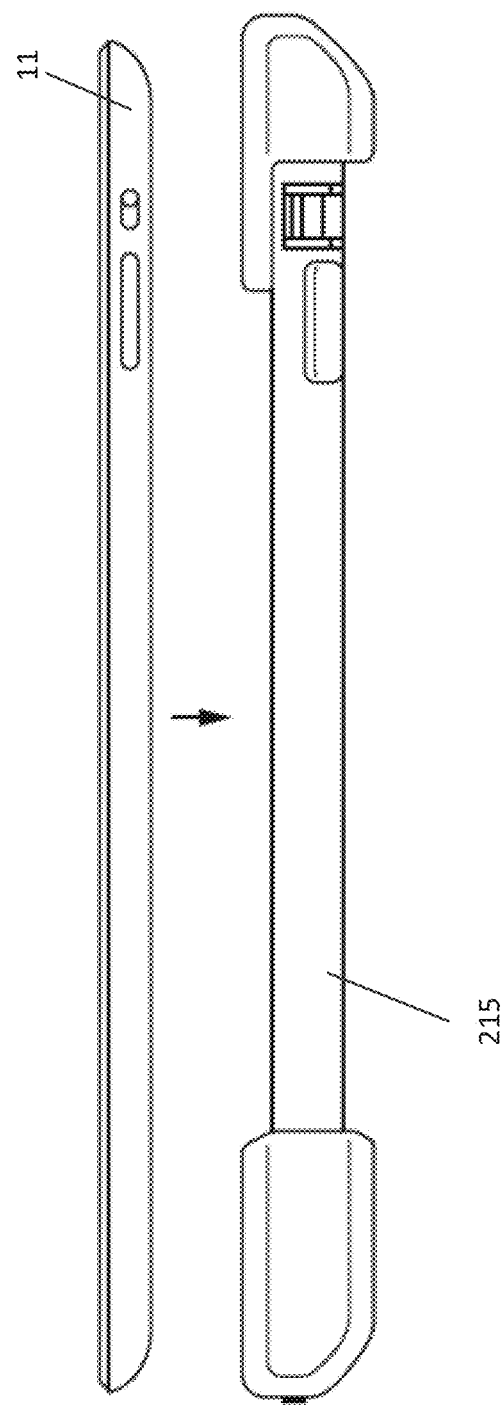
FIG. 24 illustrates an operation for enclosing a tablet within the sleeve shown in FIG. 21.
Figure 25:
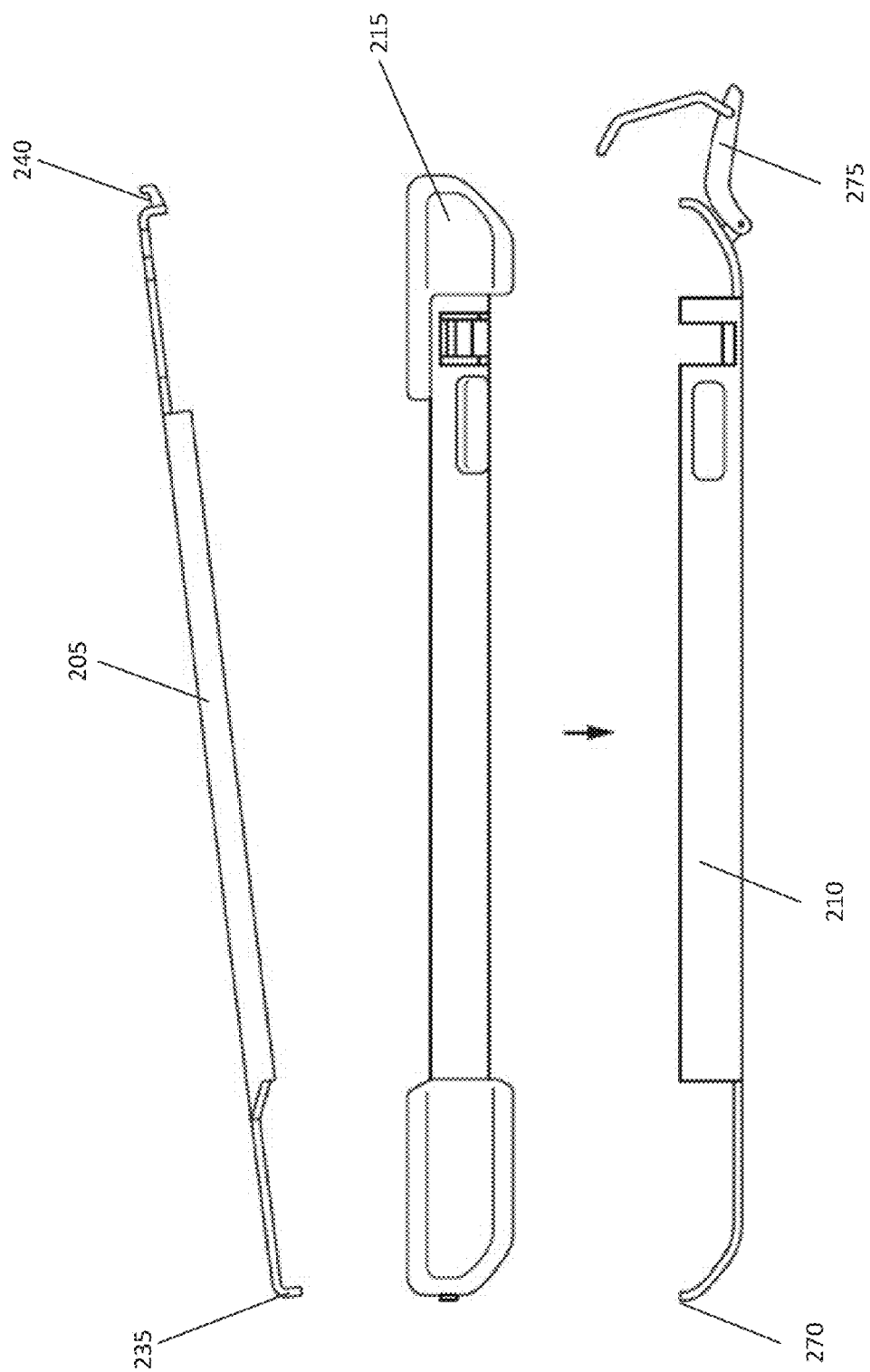
FIG. 25 illustrates the operation for enclosing the sleeve within the case of FIG. 13.
Figure 26:
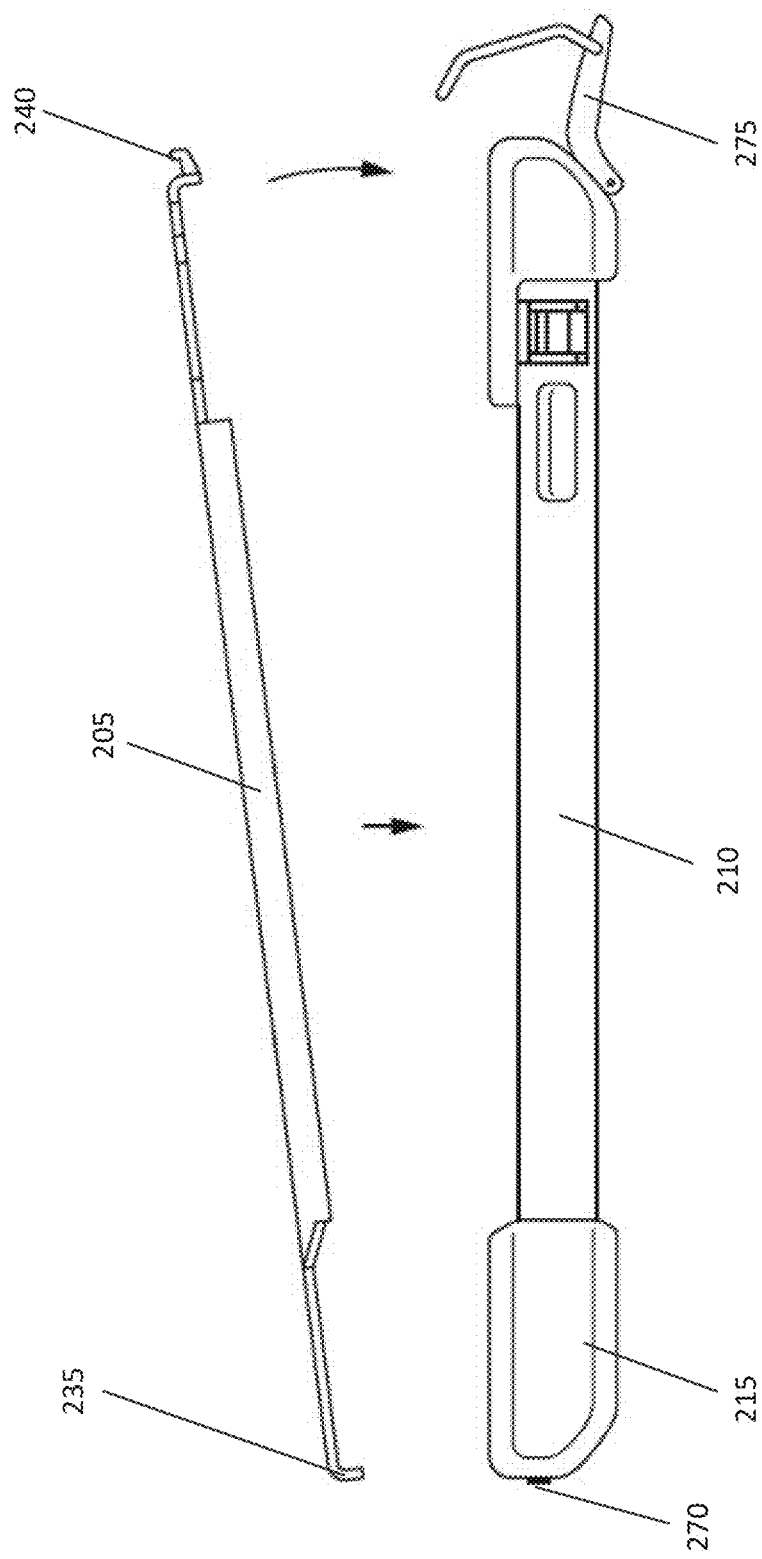
FIG. 26 illustrates the operation for enclosing the sleeve within the case of FIG. 13.
Figure 27:
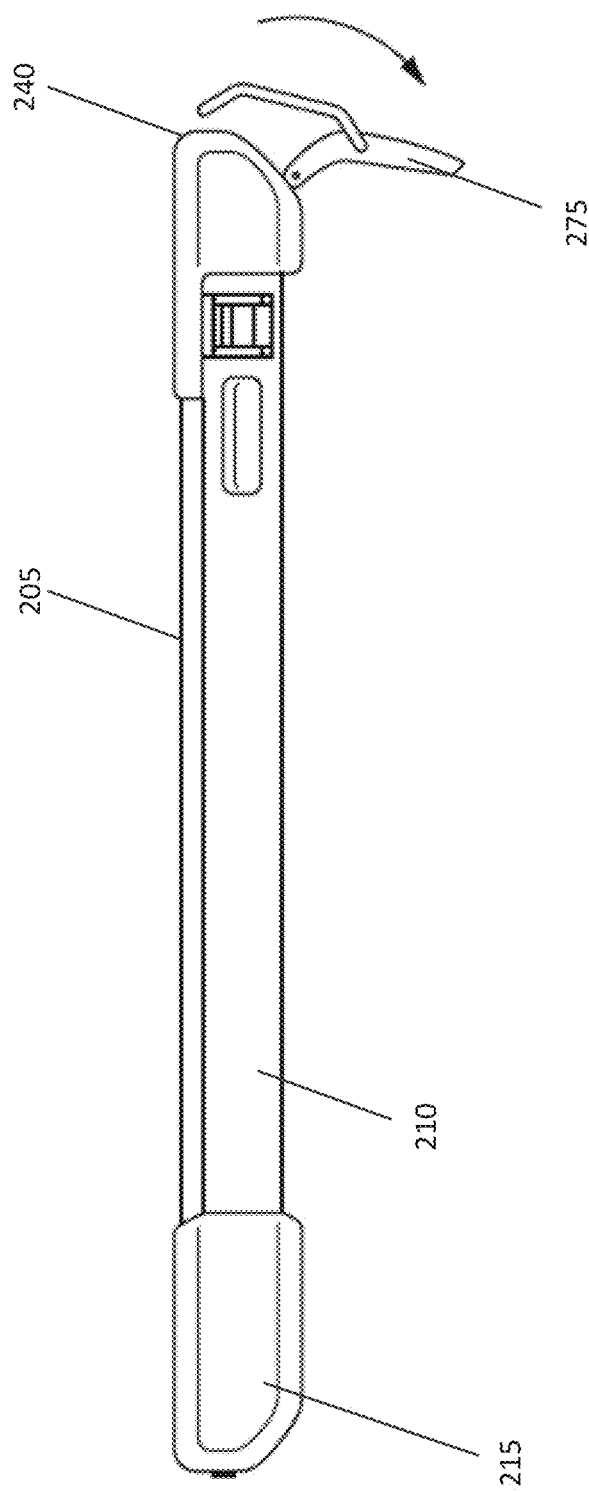
FIG. 27 illustrates the operation for enclosing the sleeve within the case of FIG. 13.

FIGS. 24-27 illustrate operation of enclosing the tablet 11 within the case 200. As illustrated in FIG. 24, the tablet 11 is first placed within the sleeve 215. Referring to FIG. 25, the sleeve 215 containing the tablet 11 is placed within the rear portion 210 of the case. Referring to FIGS. 26 and 27, the front portion 215 is then coupled to the rear portion 210, thereby enclosing the sleeve 215 within. The tab 235 of the front portion 15 couples to the latch 270 of the rear portion 210 in order to secure the two portions together. The buckle 275 of the rear portion 210 is then latched onto the hook 240 of the front portion 205 for further securement.

Figure 29:
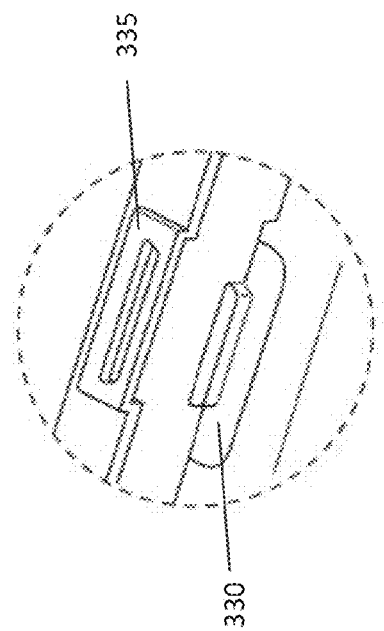
FIGS. 28 and 29 illustrate snaps and snap apertures of the case shown in FIG. 13.
Figure 28:
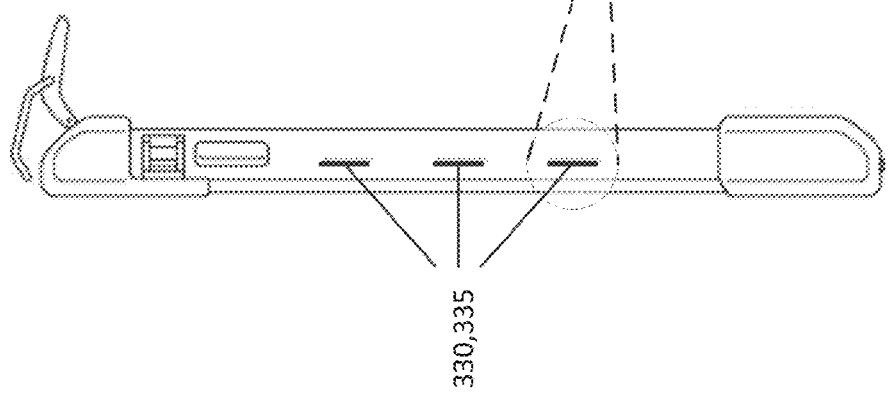

FIGS. 28 and 29 illustrate snaps 330 and snap apertures 335 to further secure the front portion 205 of the case 200 to the rear portion 210. In the illustrated embodiment, the snaps 330 are located on the side of the front portion 205 and the snap apertures 335 are located on the side of the rear portion 210. In other embodiments, the location of the snaps 330 snap apertures 335 are reversed.

Figure 30:
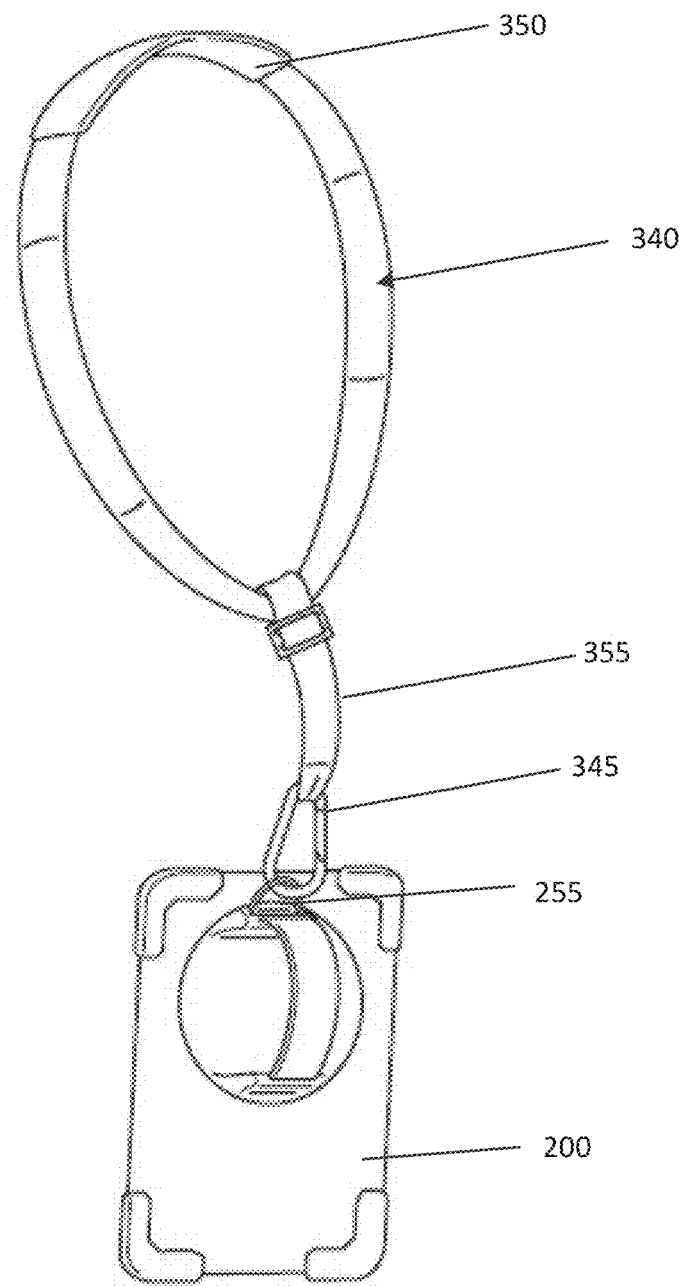
FIG. 30 illustrates an accessory-attachment point in use with a shoulder strap for hands-free carrying of the case shown in FIG. 13.
Figure 31:
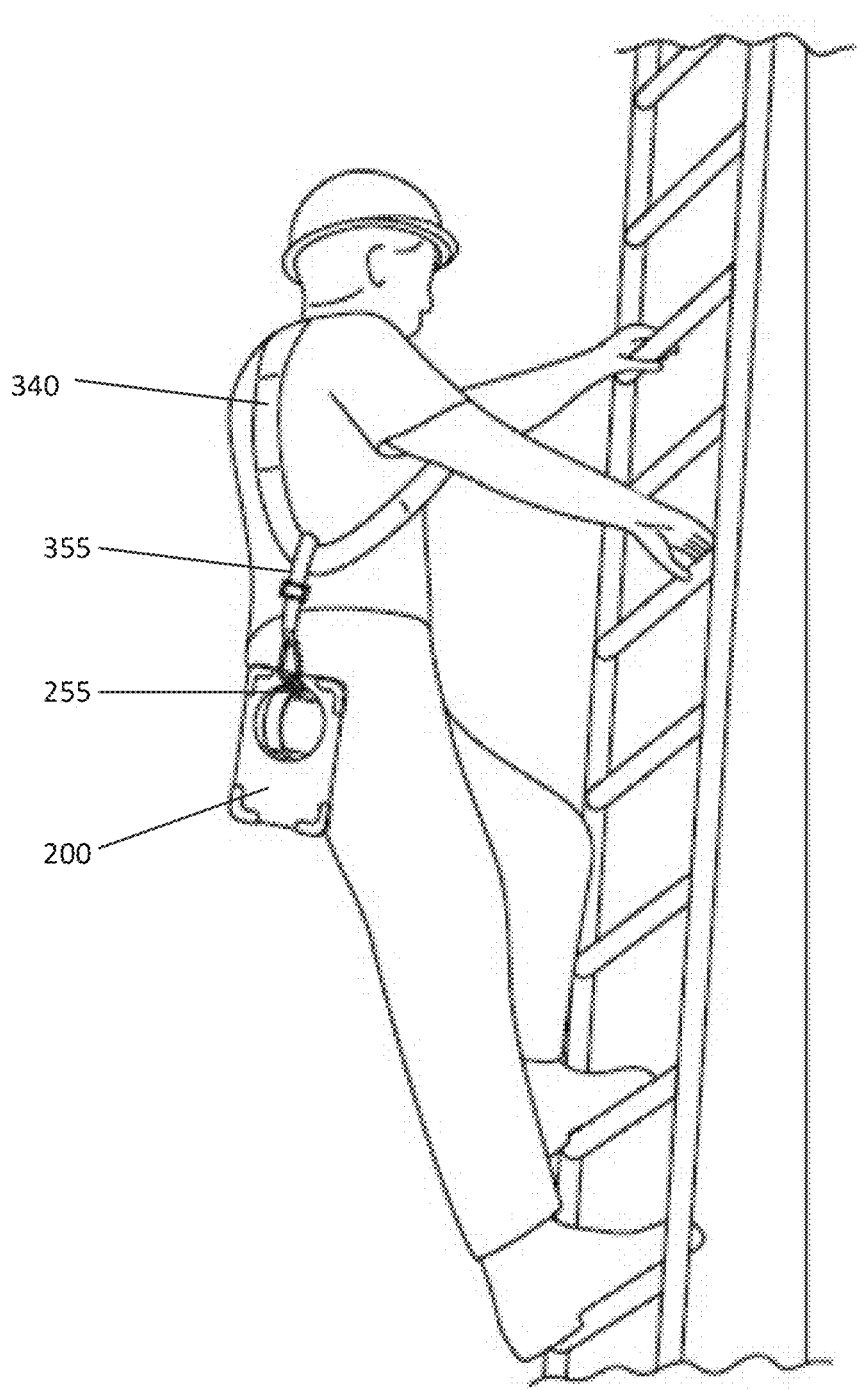
FIG. 31 illustrates hands-free carrying of the case utilizing the shoulder strap of FIG. 30.
Figure 33:
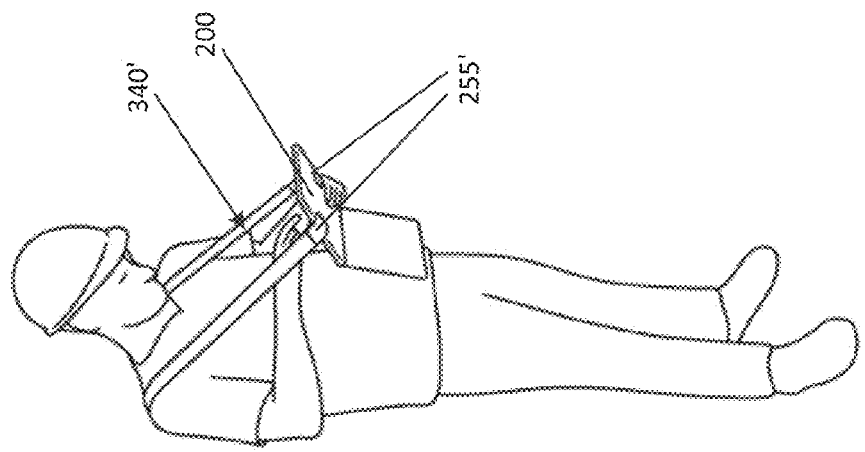
FIG. 33 illustrates hands-free carrying of the case utilizing the strap shown in FIG. 32.
Figure 32:
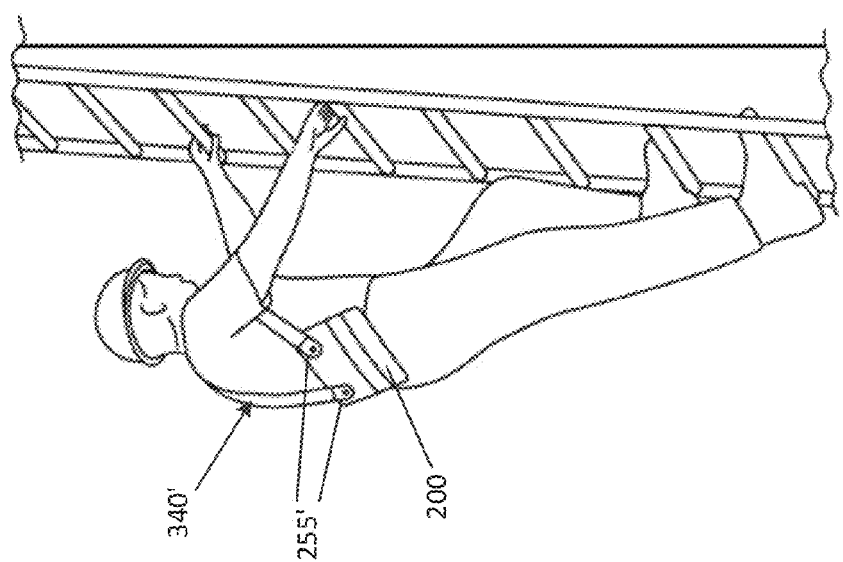
FIG. 32 illustrates hands-free carrying of the case utilizing a shoulder strap according to another embodiment of the invention.

FIGS. 30-33 illustrate the accessory-attachment point 255 in use with a shoulder strap 340 for hands-free carrying of the case 200. Referring to FIG. 30, the shoulder strap 340 is attached to the accessory-attachment point 255 via a carabiner 345, or similar attachment mechanism. The shoulder strap 340 further includes a shoulder pad 350 and an adjustable connector 355. The shoulder pad 350 adds padding to the shoulder strap 350 for additional comfort. The shoulder pad 350 can further include a non-slip surface, such as rubber, to secure the shoulder strap 340 on the user's shoulder. The adjustable connector 355 allows the shoulder strap 340 to be adjusted based on the height and/or preference of the user. As shown in FIG. 31, the shoulder strap 340 allows hands-free carrying of the case 200. As shown in FIGS. 32 and 33, another embodiment of the case 200 includes two or more accessory-attachment points 255'. In this embodiment, the shoulder strap 340' is attached to the case 200 via the two attachment points 255'.

Figure 34:
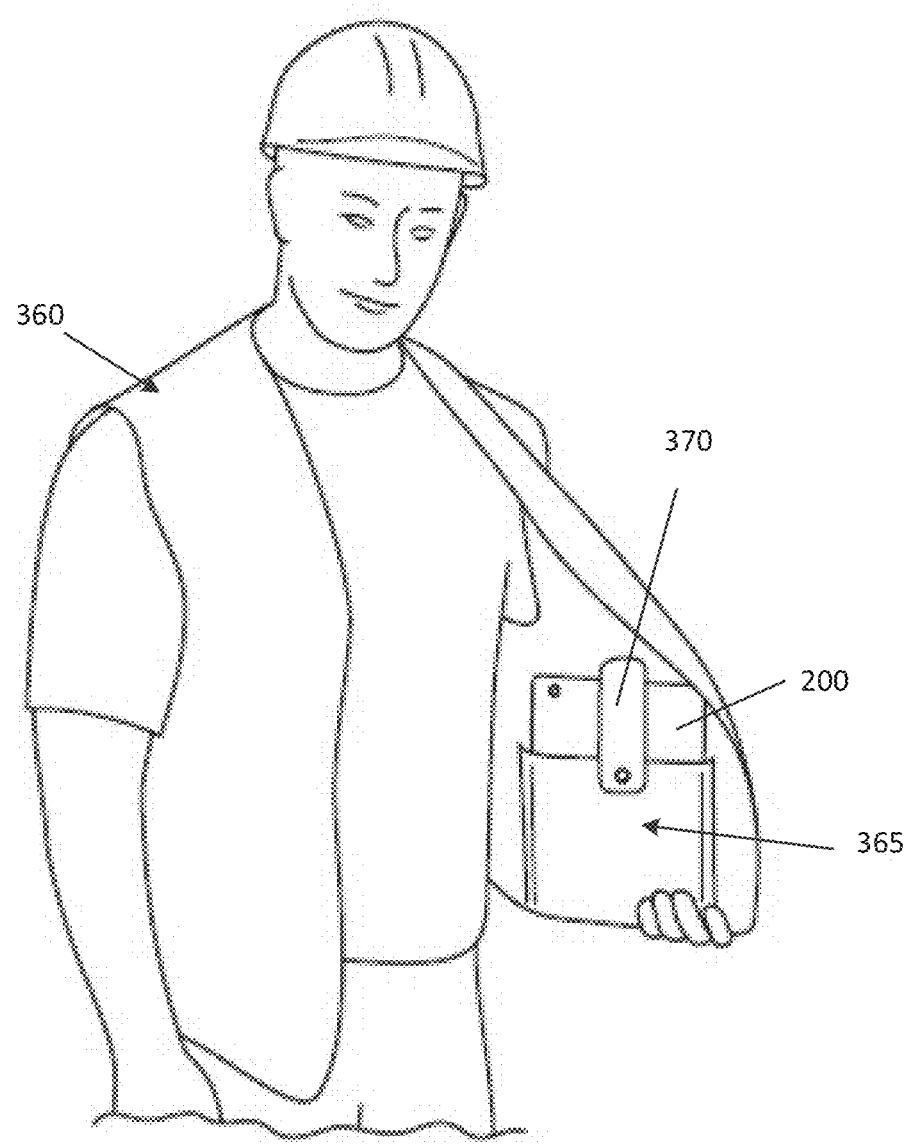
FIG. 34 illustrates a vest which can be used to the transport the case shown in FIG. 13.
Figure 36:
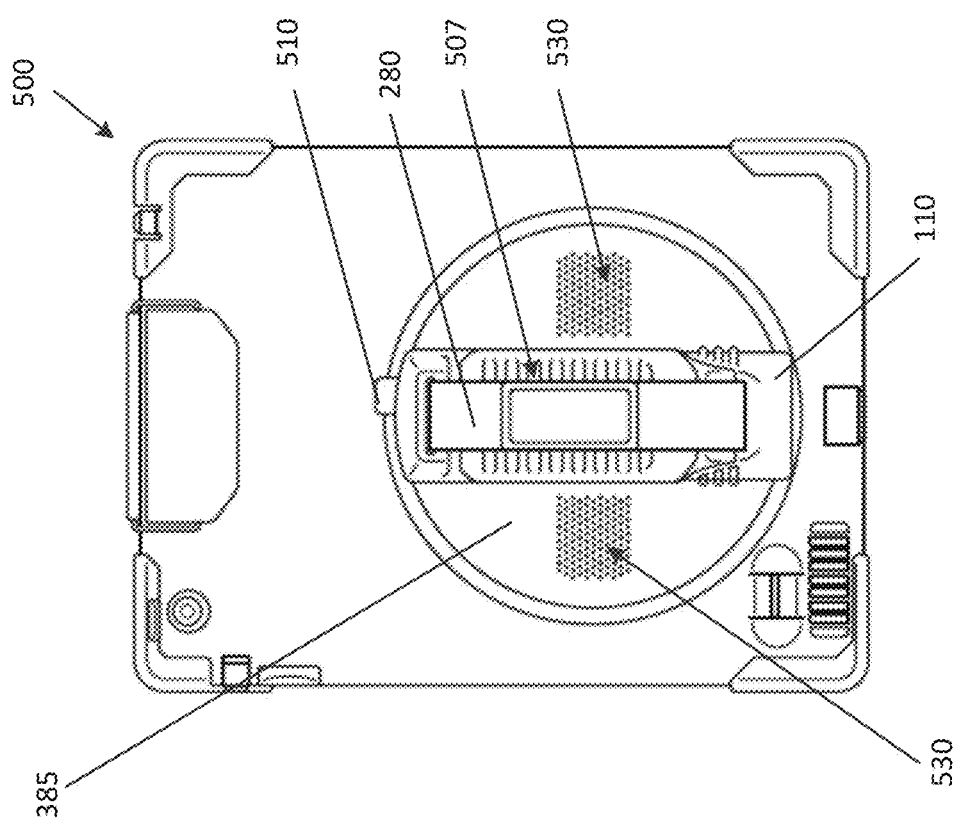
FIG. 36 is a rear view of the case shown in FIG. 35.
Figure 35:
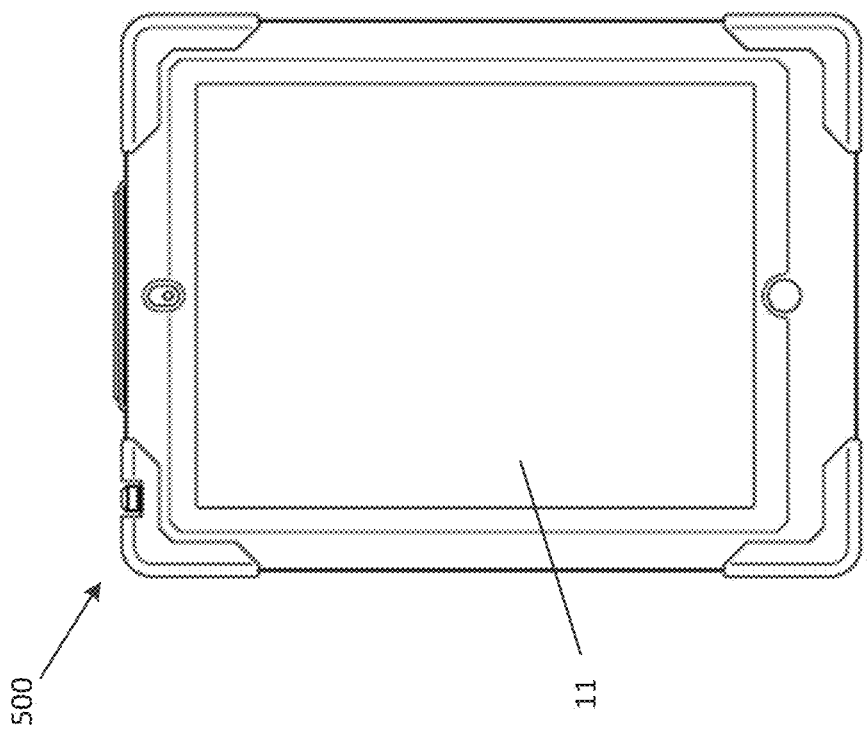
FIG. 35 is a front view of a tablet case according to another embodiment of the invention.
Figure 38:
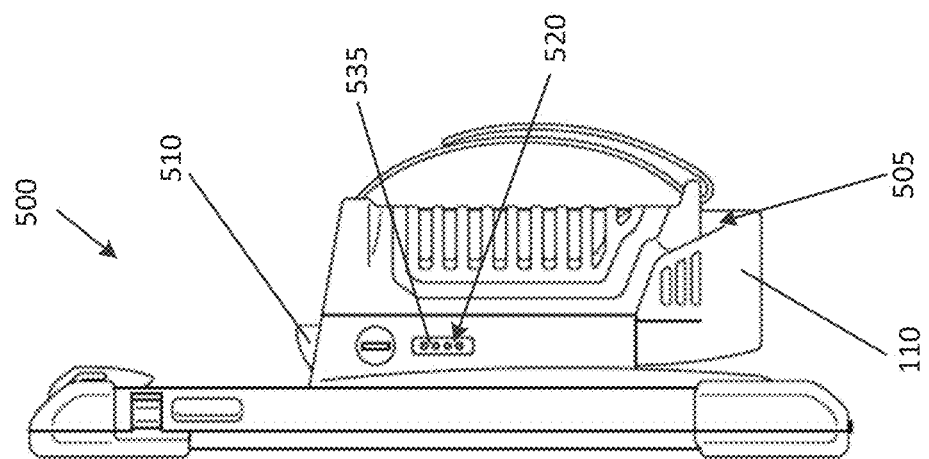
FIG. 38 is a side view of the case shown in FIG. 35.
Figure 37:
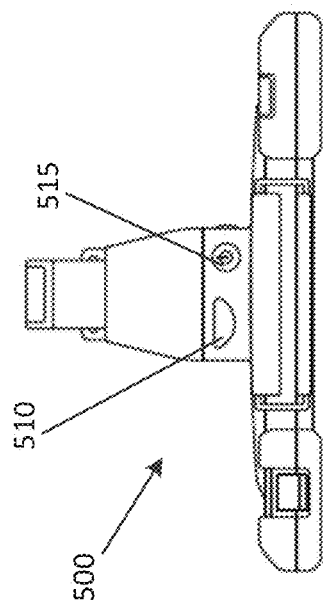
FIG. 37 is a top view of the case shown in FIG. 35.

FIG. 34 illustrates a vest 360, which can be used with the case 200. The vest 360 includes a pocket 365 and a closure strap 370. The case 200 fits into the pocket 365 and is secured within the pocket 365 by the strap 370. In the illustrated embodiment, the strap 370 connects to the pocket 365 via snaps, Velcro, or other similar attachment devices, thereby securing the case 200 within the pocket 365. In another embodiment, the strap 370 connects to the accessory-attachment point 255, of the case 200, to secure the case 200 within the pocket 365.

FIGS. 35-39 illustrate a case 500 according to another embodiment invention. The case 500 is similar to the embodiment shown in FIGS. 13-29, and only new features of the case 500 will be described herein. The case 500 includes a battery receptacle 505, a light 510, a light switch 515, a fuel gauge 520, a fuel gauge switch 525, and fan vents 530.

The battery receptacle 505 is located on the handle base 285 of the case 500. The handle base 285 and the battery receptacle 505 are located in the rear of the case 500. The battery receptacle is operable to receive the battery 110. The battery receptacle 505, along with the strap 280, constitute a handle 507. The handle 507 allows the user to hold the case 500.

The light 510 is located on the battery receptacle 505. The light 510 provides a light source, which may be used as a camera flash for the tablet camera or as a flashlight. In the illustrated embodiment, the light 510 is a single LED (light-emitting diode) light. In another embodiment, the light 510 includes a plurality of LED lights or another light source. The light switch 515 is located on the battery receptacle 505 in proximity to the light 510. The light switch 515 controls operation of the light 510. In one embodiment, the light switch 515 is an on/off switch, which either powers the light 510 on or off. In another embodiment the light switch 515 is a toggle switch, which toggles between different functions of the light 510, such as on/off, a strobe function, or brightness of the light 510.

The fuel gauge 520 provides an indication of the charge of the battery 110. The fuel gauge 520 includes a display 535. The fuel gauge switch 525 controls activation of the display 535. In one embodiment, the display 535 comprises of multiple LEDs arranged to form a scale. A number of LEDs are illuminated when the battery 110 is charged, while one or no LEDs are illuminated when the battery 110 is not charged. In another embodiment, the display 535 includes one or more LEDs, one of which is green and one of which is red. When the battery 110 is charged the green LED is illuminated, when the battery 110 is not charged the red LED is illuminated. In another embodiment the display 535 comprises an LCD (liquid crystal display), or similar screen, which displays an indication of the charge of the battery 110.

The fan vents 530 are located on the handle base 285 of the case 500. The fan vents 530 are used in conjunction with a fan to keep the tablet 500 at a desirable operating temperature. The fan pulls in cool air through the fan vents 530 to cool the tablet 500.

When the battery 110 is placed within the battery receptacle 505, the battery 110 can further act as a stand to support the case 500 in a portrait orientation or a landscape orientation.

Figure 39:
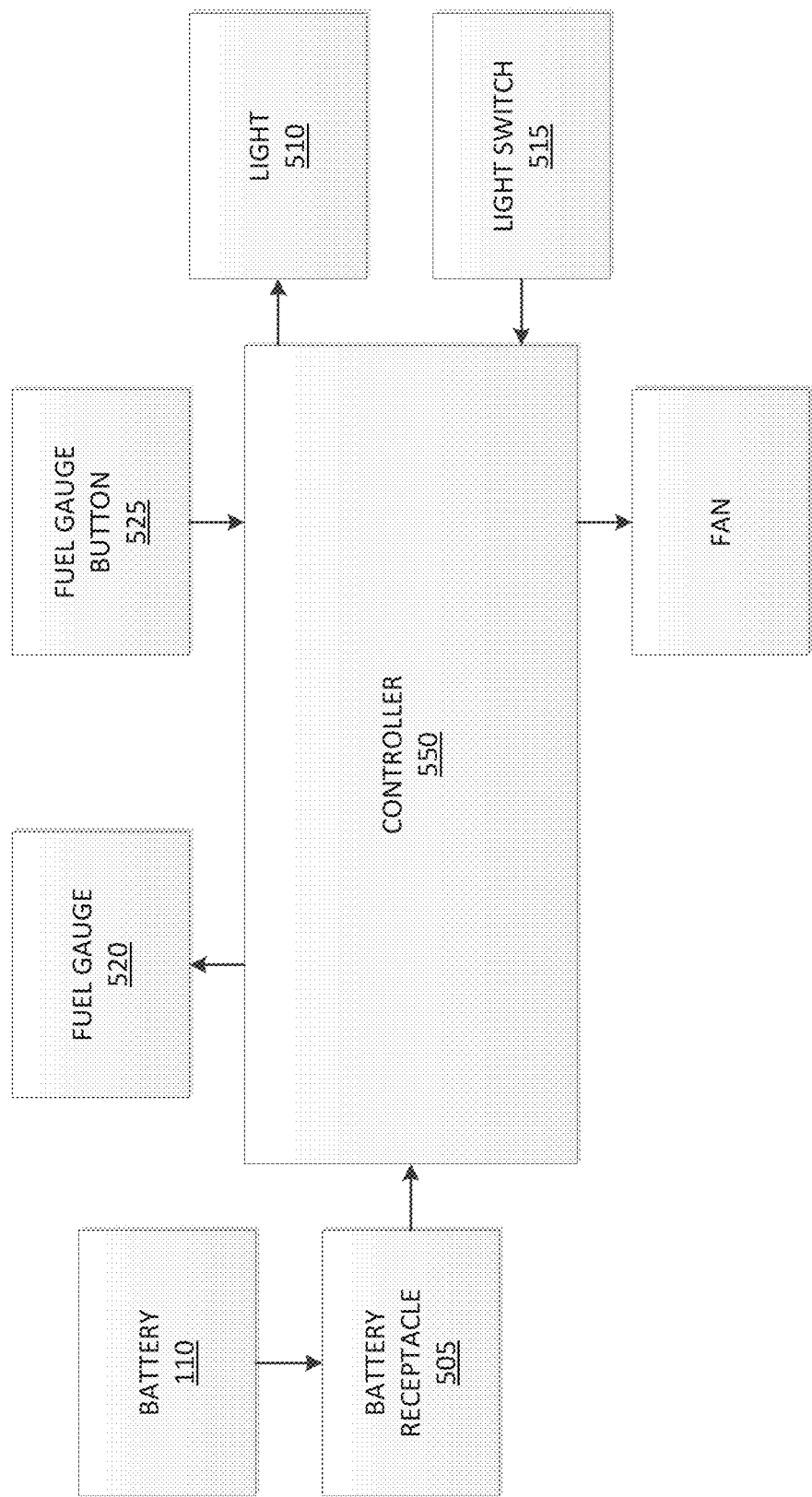
FIG. 39 illustrates a controller or use with the case shown in FIG. 35.

Referring to FIG. 39, a controller 550 for use with the case 500 is shown. The controller 550 has a similar construction as the controller 50, discussed above with respect to FIGS. 1-12. The controller 550 controls the operation of the case 500 and is electrically connected to the battery receptacle 505, the light 510, the light switch 515, the fuel gauge 520, the fuel gauge switch 525, and the fan.

Thus, the invention provides, among other things, a computer case for protecting a computer, such as a tablet computer. Various features and advantages of the invention are set forth in the following claims.

What is claimed is:

1. A computer case for protecting a computer, the computer case comprising:
a front housing including a first aperture operable to allow a user to operate the computer; and
a rear housing pivotally coupled to the front housing, the rear housing including a latch for securing the computer between the front housing and the rear housing, a battery receptacle for receiving a battery, an electrical interface for electrical communication with the computer, an electrical input, a light powered by the battery, a fuel gauge having at least one fuel light, and a controller operable to
receive power from the battery,
provide power to the computer via the electrical interface,
provide power to the light,
determine a voltage of the battery,
display the voltage of the battery by providing power to the at least one fuel light of the fuel gauge,
receive an electrical signal from the electrical input, and
output the electrical signal to the computer via the electrical interface.

2. The computer case of claim 1, further comprising a handle.

3. The computer case of claim 2, wherein the battery receptacle is integrally formed with the handle.

4. The computer case of claim 1, wherein the handle is operable to support the case in a landscape orientation or a portrait orientation.

5. The computer case of claim 1, further comprising a fan supported by the rear housing and powered by the battery, the fan operable to regulate a temperature of the computer.

6. The computer case of claim 5, further comprising a fan switch operable to control power to the fan.

7. The computer case of claim 1, further comprising a light switch operable to control power to the light.

8. The computer case of claim 1, further comprising a sleeve for receiving the computer, wherein the sleeve is disposed in a cavity formed by the front and rear housings.

9. The computer case of claim 1, wherein the battery is a power tool battery.

10. A computer case for protecting a computer, the computer case comprising:
a front housing including a first aperture operable to allow a user to operate the computer;
a rear housing including a latch, a handle, a light powered by the battery, and a fuel gauge having at least one fuel light, the fuel gauge operable to display a voltage of the battery via the at least one fuel light, and
a sleeve including a plurality of bumpers, wherein the computer is placed within the sleeve and the sleeve is placed between the front and rear housing, and further wherein the latch secures the front housing and the rear housing in a closed position.

11. The computer case of claim 10, wherein the front housing and the rear housing are composed of plastic.

12. The computer case of claim 10, wherein the sleeve is composed of rubber.

13. The computer case of claim 10, further comprising a battery receptacle coupled to the rear housing, the battery receptacle configured for receiving a battery.

14. The computer case of claim 13, wherein the battery is a power tool battery.

15. The computer case of claim 13, wherein the rear housing further includes a fan operable to regulate the temperature of the computer, the fan powered by the battery.

16. The computer case of claim 15, further comprising a controller operable to control at least one of the light, the fuel gauge, and the fan.

17. The computer case of claim 13, wherein the battery receptacle and battery are operable to support the computer case in a portrait orientation.

18. The computer case of claim 10, wherein the bumpers are operable to protect the computer from impact.

19. A computer case for protecting a computer, the computer case comprising:
a front housing including a first aperture operable to allow a user to operate the computer; and
a rear housing pivotally coupled to the front housing, the rear housing including
a latch for securing the computer between the front housing and the rear housing,
a handle having a battery receptacle integrated into the handle, the battery receptacle configured to receive a battery,
an electrical interface for electrical communication with the computer, and
a controller operable to
receive power from the battery, and
provide power to the computer via the electrical interface.

20. The computer case of claim 19, wherein the battery, when received by the battery receptacle, is operable to support the computer case in at least one selected from the group consisting of a horizontal landscape and a vertical landscape.

* * * * *